US012676038B2

(12) United States Patent (10) Patent No.: US 12,676,038 B2
Moriyama (45) Date of Patent: Jul. 7, 2026

(54) ENTRY MANAGEMENT SYSTEM, ENTRY MANAGEMENT METHOD, AND RECORDING MEDIUM

(71) Applicant: NEC Corporation, Tokyo (JP)

(72) Inventor: Satoshi Moriyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/841,033

(22) PCT Filed: Mar. 10, 2022

(86) PCT No.: PCT/JP2022/010624
§ 371 (c)(1),
(2) Date: Aug. 23, 2024

(87) PCT Pub. No.: WO2023/170871
PCT Pub. Date: Sep. 14, 2023

(65) Prior Publication Data
US 2025/0166440 A1 May 22, 2025

(51) Int. Cl.
*G07C 9/15* (2020.01)
*G06V 20/52* (2022.01)
(Continued)

(52) U.S. Cl.
CPC .............. *G07C 9/15* (2020.01); *G06V 20/52* (2022.01); *G06V 20/625* (2022.01);
(Continued)

(58) Field of Classification Search
CPC ... G07C 9/15; G07C 9/37; G07C 9/38; G07C 9/00896; G07C 9/10; G06V 20/52; G06V 2201/08
See application file for complete search history.

(56) References Cited

U.S. PATENT DOCUMENTS

2005/0055582 A1* 3/2005 Bazakos ................. G06F 21/35
726/19
2007/0205861 A1* 9/2007 Nair ........................ F16P 3/147
340/572.1
(Continued)

FOREIGN PATENT DOCUMENTS

JP        2003-303363 A      10/2003
JP        2004-110154 A       4/2004
(Continued)

OTHER PUBLICATIONS

International Search Report for PCT Application No. PCT/JP2022/010624, mailed on May 24, 2022.

*Primary Examiner* — Vernal U Brown
(74) *Attorney, Agent, or Firm* — Sughrue Mion, PLLC

(57) ABSTRACT

An entry management system includes: a storage unit that stores registration information in which vehicle information indicating a vehicle number of a registered vehicle is associated with person information including a registration image of a registered person; a first imaging unit that generates a vehicle image by imaging a target vehicle located at a vehicle entrance; a first determination unit that determines whether or not the target vehicle is the registered vehicle, by comparing a vehicle number of the target vehicle captured in the vehicle image with the vehicle number of the registered vehicle indicated by the vehicle information; a second imaging unit that generates a person image by imaging the target person in the target vehicle; a second determination unit that determines whether or not the target person is the registered person, by comparing the person image with the registration image; and an entry management unit that permits the target vehicle to pass through the
(Continued)

vehicle entrance when the target vehicle is determined to be the registered vehicle and the target person is determined to be the registered person.

7 Claims, 10 Drawing Sheets

(51) Int. Cl.
    *G06V 20/62*        (2022.01)
    *G06V 40/16*        (2022.01)
    *G07C 9/37*         (2020.01)
(52) U.S. Cl.
    CPC .............. *G06V 40/172* (2022.01); *G07C 9/37* (2020.01); *G06V 2201/07* (2022.01); *G06V 2201/08* (2022.01)

(56)           References Cited

U.S. PATENT DOCUMENTS

| | | |
|---|---|---|
| 2015/0278617 A1 | 10/2015 | Oami |
| 2015/0294144 A1 | 10/2015 | Konishi |
| 2016/0239714 A1 | 8/2016 | Oami et al. |
| 2019/0114563 A1 | 4/2019 | Yukimoto |

FOREIGN PATENT DOCUMENTS

| | | |
|---|---|---|
| JP | 2010-191800 A | 9/2010 |
| JP | 4932437 B2 | 5/2012 |
| JP | 2018-081449 A | 5/2018 |
| JP | 2018-106315 A | 7/2018 |
| WO | 2014/061195 A1 | 4/2014 |
| WO | 2014/064898 A1 | 5/2014 |
| WO | 2015/052896 A1 | 4/2015 |

* cited by examiner

521

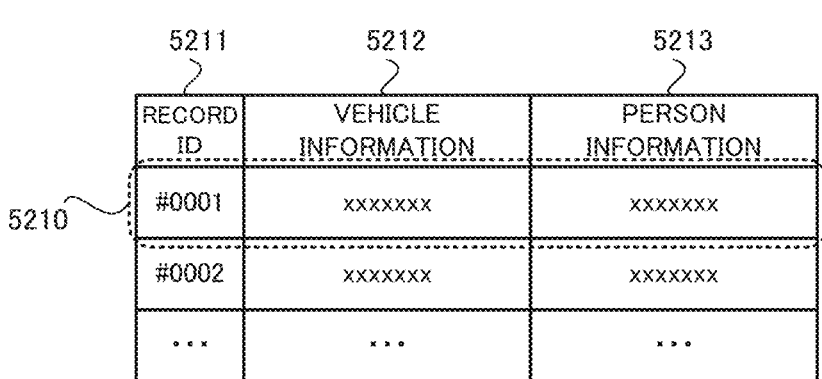

| RECORD ID | VEHICLE INFORMATION | PERSON INFORMATION |
|---|---|---|
| #0001 | xxxxxxx | xxxxxxx |
| #0002 | xxxxxxx | xxxxxxx |
| . . . | . . . | . . . |

| VEHICLE NUMBER INFORMATION | NUMBER-OF-PERSONS INFORMATION | MANAGER INFORMATION | VEHICLE PERMITTED AREA INFORMATION |
|---|---|---|---|

| PERSON ID | REGISTRA-TION IMAGE | PERSON PERMITTED AREA INFORMATION | ATTENDANCE INFORMATION |
|---|---|---|---|
| PERSON ID | REGISTRA-TION IMAGE | PERSON PERMITTED AREA INFORMATION | ATTENDANCE INFORMATION |
| . . . | . . . | . . . | . . . |

FIG. 8C

ENTRY MANAGEMENT SYSTEM, ENTRY MANAGEMENT METHOD, AND RECORDING MEDIUM

This application is a National Stage Entry of PCT/JP2022/010624 filed on Mar. 10, 2022, the contents of all of which are incorporated herein by reference, in their entirety.

TECHNICAL FIELD

This disclosure relates to, for example, technical fields of an entry management system, an entry management method, and a recording medium that are configured to manage/control entry to an entry restricted area of a person who enters the entry restricted area by vehicle.

BACKGROUND ART

Patent Literature 1 describes an example of an entry management system that is configured to manage/control entry/admission to an entry restricted area of a person who enters the entry restricted area by vehicle. In addition, as prior art literatures related to this disclosure, Patent Literatures 2 to 9 are cited.

CITATION LIST

Patent Literature

Patent Literature 1: JP2003-303363A
Patent Literature 2: JP2018-106315A
Patent Literature 3: JP2010-191800A
Patent Literature 4: JP4932437B
Patent Literature 5: JP2018-081449A
Patent Literature 6: JP2004-110154A
Patent Literature 7: International Publication No. WO2015/052896 pamphlet
Patent Literature 8: International Publication No. WO2014/064898 pamphlet
Patent Literature 9: International Publication No. WO2014/061195 pamphlet

SUMMARY

Technical Problem

It is an example object of this disclosure to provide an entry management system, an entry management method, and a recording medium that are intended to improve the techniques/technologies described in Citation List.

Solution to Problem

An entry management system according to an example aspect of this disclosure is an entry management system that manages entry to an entry restricted area of a target person who enters the entry restricted area in a target vehicle, the entry management system including: a storage unit that stores registration information in which vehicle information indicating a vehicle number of a registered vehicle that is scheduled to enter the entry restricted area is associated with person information including a registration image of a registered person who is scheduled to enter the entry restricted area in the registered vehicle; a first imaging unit that generates a vehicle image by imaging the target vehicle located at a vehicle entrance through which the target vehicle should pass to enter the entry restricted area; a first determination unit that determines whether or not the target vehicle located at the vehicle entrance is the registered vehicle, by comparing a vehicle number of the target vehicle captured in the vehicle image with the vehicle number of the registered vehicle indicated by the vehicle information; a second imaging unit that generates a person image by imaging the target person in the target vehicle located at the vehicle entrance; a second determination unit that determines whether or not the target person in the target vehicle is the registered person, by comparing the person image with the registration image indicated by the person information; and an entry management unit that permits the target vehicle to pass through the vehicle entrance when the target vehicle located at the vehicle entrance is determined to be the registered vehicle and the target person in the target vehicle is determined to be the registered person, but does not permit the target vehicle to pass through the vehicle entrance when the target vehicle located at the vehicle entrance is determined to be not the registered vehicle and/or the target person in the target vehicle is determined to be not the registered person.

An entry management method according to an example aspect of this disclosure is an entry management method that manages entry to an entry restricted area of a target person who enters the entry restricted area in a target vehicle, the entry management method including: storing registration information in which vehicle information indicating a vehicle number of a registered vehicle that is scheduled to enter the entry restricted area is associated with person information including a registration image of a registered person who is scheduled to enter the entry restricted area in the registered vehicle; generating a vehicle image by imaging the target vehicle located at a vehicle entrance through which the target vehicle should pass to enter the entry restricted area; determining whether or not the target vehicle located at the vehicle entrance is the registered vehicle, by comparing a vehicle number of the target vehicle captured in the vehicle image with the vehicle number of the registered vehicle indicated by the vehicle information; generating a person image by imaging the target person in the target vehicle located at the vehicle entrance; determining whether or not the target person in the target vehicle is the registered person, by comparing the person image with the registration image indicated by the person information; permitting the target vehicle to pass through the vehicle entrance when the target vehicle located at the vehicle entrance is determined to be the registered vehicle and the target person in the target vehicle is determined to be the registered person; and not permitting the target vehicle to pass through the vehicle entrance when the target vehicle located at the vehicle entrance is determined to be not the registered vehicle and/or the target person in the target vehicle is determined to be not the registered person.

A recording medium according to an example aspect of this disclosure is a recording medium on which a computer program that allows a computer to execute an entry management method is recorded, the entry management method managing entry to an entry restricted area of a target person who enters the entry restricted area in a target vehicle, the entry management method including: storing registration information in which vehicle information indicating a vehicle number of a registered vehicle that is scheduled to enter the entry restricted area is associated with person information including a registration image of a registered person who is scheduled to enter the entry restricted area in the registered vehicle; generating a vehicle image by imaging the target vehicle located at a vehicle entrance through which the target vehicle should pass to enter the entry restricted area; determining whether or not the target vehicle located at the vehicle entrance is the registered vehicle, by comparing a vehicle number of the target vehicle captured in the vehicle image with the vehicle number of the registered vehicle indicated by the vehicle information; generating a person image by imaging the target person in the target vehicle located at the vehicle entrance; determining whether or not the target person in the target vehicle is the registered person, by comparing the person image with the registration image indicated by the person information; permitting the target vehicle to pass through the vehicle entrance when the target vehicle located at the vehicle entrance is determined to be the registered vehicle and the target person in the target vehicle is determined to be the registered person; and not permitting the target vehicle to pass through the vehicle entrance when the target vehicle located at the vehicle entrance is determined to be not the registered vehicle and/or the target person in the target vehicle is determined to be not the registered person.

Each in FIG. 8A to FIG. 8C is a data structure diagram illustrating a data structure of a registration information DB.

Figure 9:
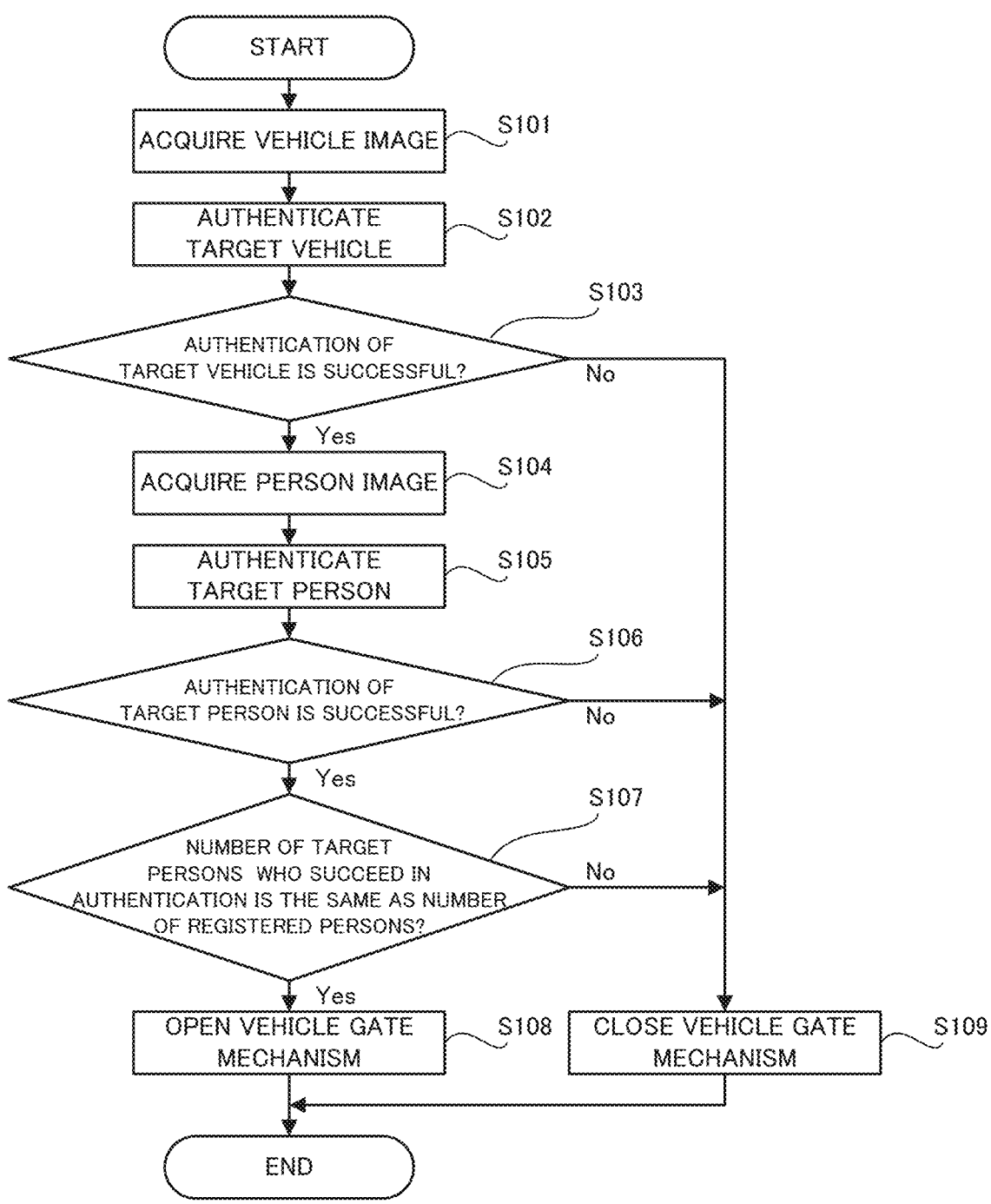

FIG. 9 is a flowchart illustrating a flow of a vehicle entry management operation performed by the entry management server.

Figure 10:
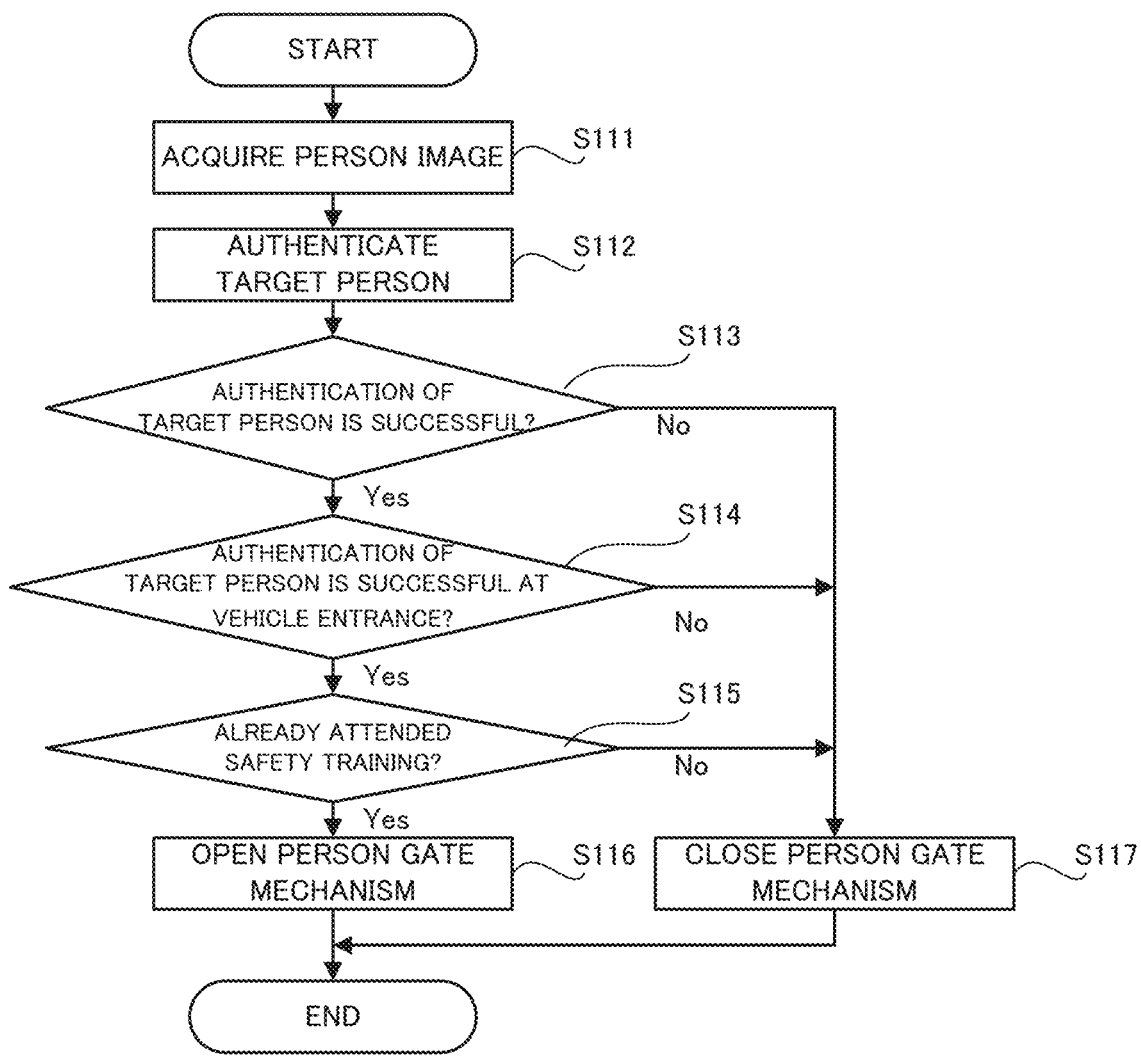

FIG. 10 is a flowchart illustrating a flow of a person entry management operation performed by the entry management server.

Figure 11:
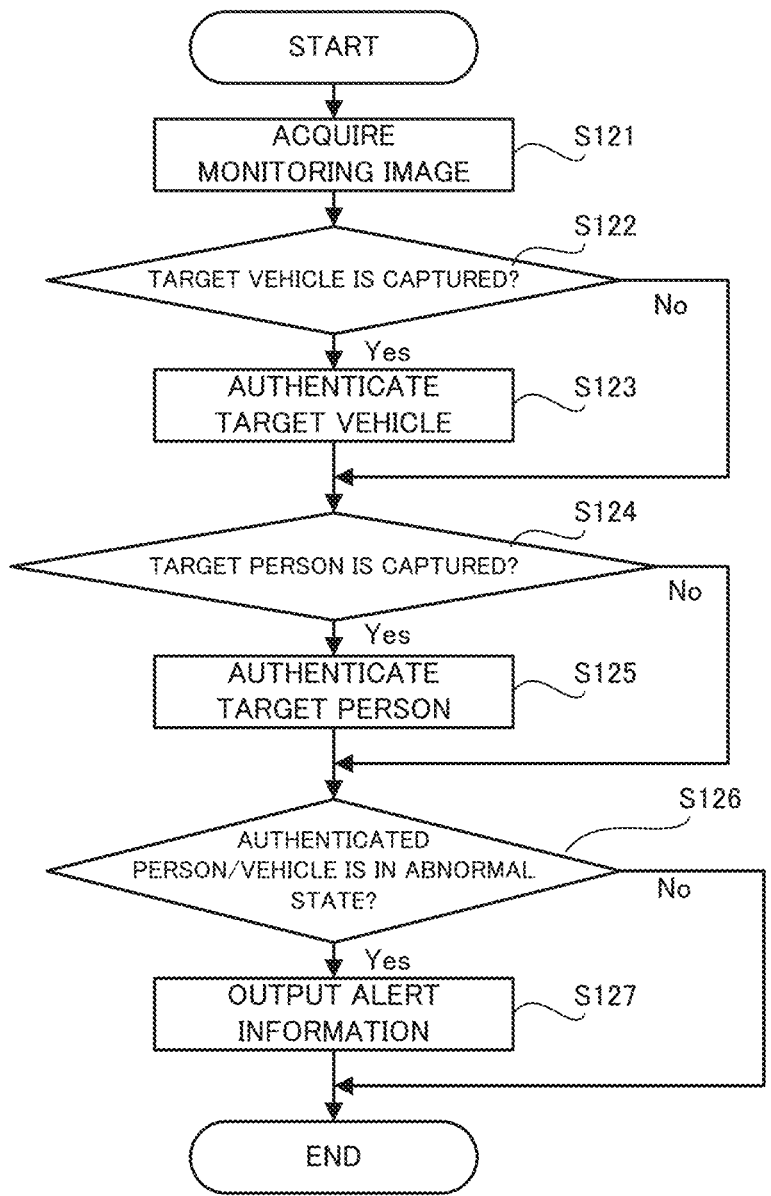

FIG. 11 is a flowchart illustrating a flow of a monitoring operation performed by the entry management server.

Figure 12:
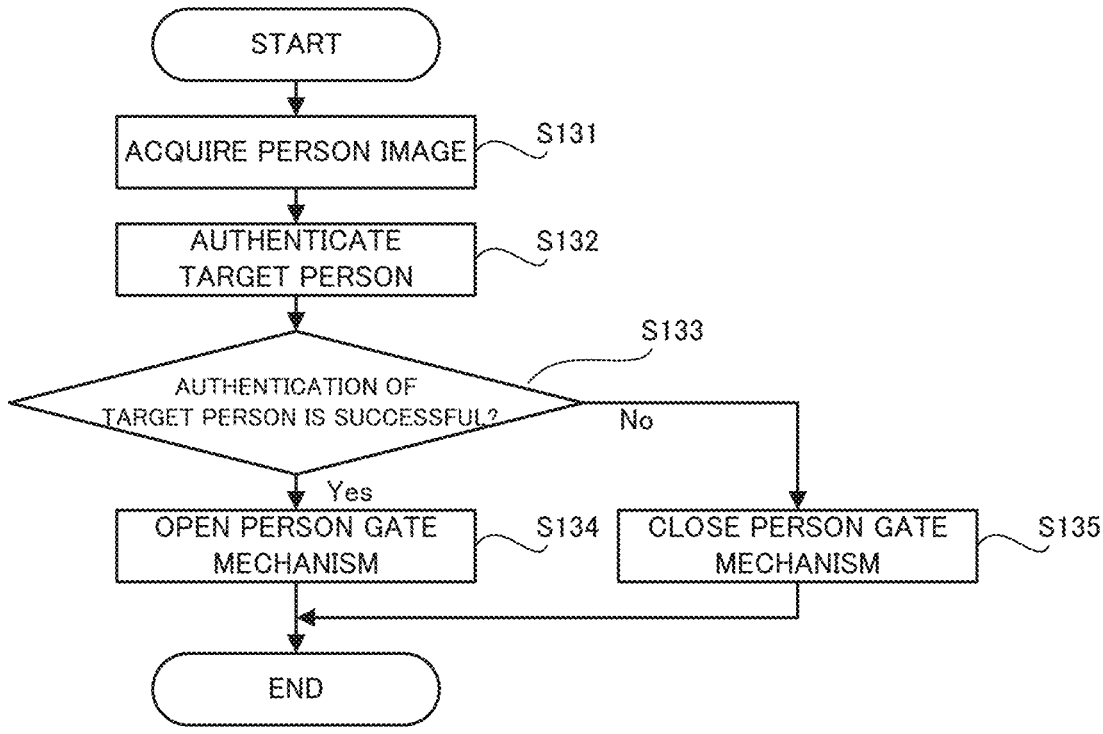

FIG. 12 is a flowchart illustrating a flow of a person exit management operation performed by the entry management server.

Figure 13:
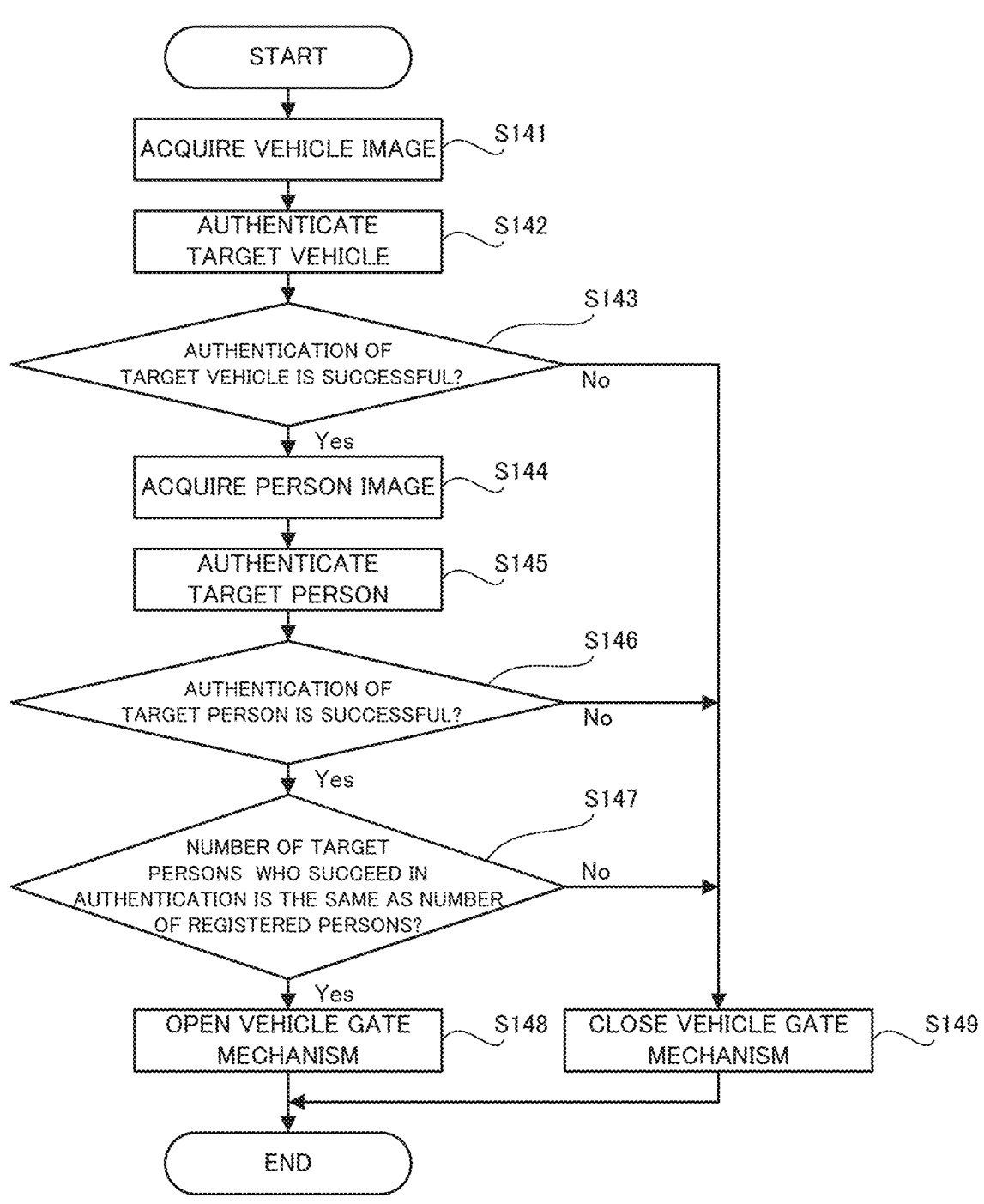

FIG. 13 is a flowchart illustrating a flow of a vehicle exit management operation performed by the entry management server.

DESCRIPTION OF EXAMPLE EMBODIMENTS

Hereinafter, with reference to the drawings, an entry management system, an entry management method, and a recording medium according to example embodiments will be described.

(1) First Example Embodiment

Figure 1:
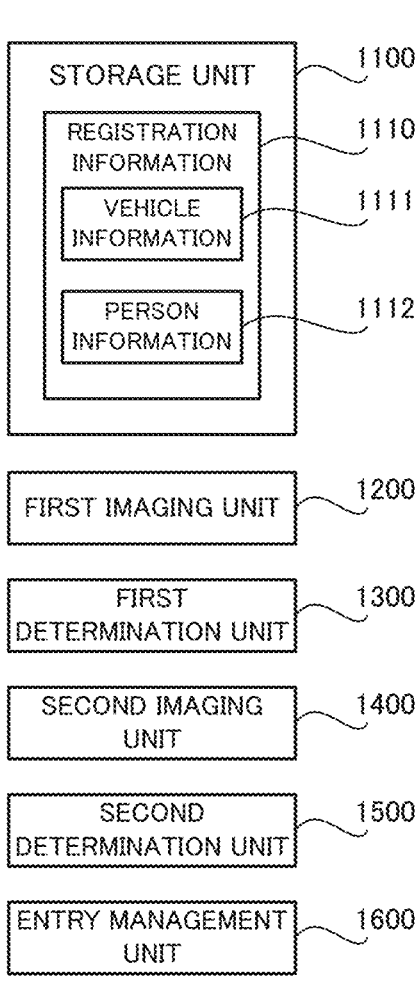
FIG. 1 is a block diagram illustrating a configuration of an entry management system in a first example embodiment.

First, an entry management system, an entry management method, and a recording medium in a first example embodiment will be described. With reference to FIG. 1, the following describes the entry management system, the entry management method, and the recording medium in the first example embodiment, by using an entry management system 1000 to which the entry management system, the entry management method, and the recording medium in the first example are applied. FIG. 1 is a block diagram illustrating a configuration of the entry management system 1000 in the first example embodiment.

The entry management system 1000 manages/controls entry/admission to an entry restricted area of a target person who enters the entry restricted area by vehicle. In order to manage the entry of the target person to the entry restricted area, the entry management system 1000 includes a storage unit 1100, a first imaging unit 1200, a first determination unit 1300, a second imaging unit 1400, a second determination unit 1500, and an entry management unit 1600.

The storage unit 1100 stores registration information 1110. The registration information 1110 is information in which vehicle information 1111 is associated with person information 1112. The vehicle information 1111 indicates a vehicle number of a registered vehicle that is scheduled to enter the entry restricted area. The person information 1112 includes a registration image of a registered person who is scheduled to enter the entry registered area by vehicle.

The first imaging unit 1200 generates a vehicle image by imaging a target vehicle located at a vehicle entrance through which the target vehicle should pass to enter the entry restricted area. The first determination unit 1300 determines whether or not the target vehicle located at the vehicle entrance is the registered vehicle, by comparing a vehicle number of the target vehicle captured in the vehicle image with the vehicle number of the registered vehicle indicated by the vehicle information.

The second imaging unit 1400 generates a person image by imaging the target person in the target vehicle located at the vehicle entrance. The second determination unit 1500 determines whether or not the target person in the target vehicle is the registered person, by comparing the person image with the registration image indicated by the person information.

The entry management unit 1600 permits the target vehicle to pass through the vehicle entrance, when the first determination unit 1300 determines that the target vehicle located at the vehicle entrance is the registered vehicle and the second determination unit 1500 determines that the target person in the target vehicle is the registered person. On the other hand, the entry management unit 1600 does not permit the target vehicle to pass through the vehicle entrance, when the first determination unit 1300 determines that the target vehicle located at the vehicle entrance is not the registered vehicle. Furthermore, the entry management unit 1600 does not permit the target vehicle to pass through the vehicle entrance, when the second determination unit 1500 determines that the target person in the target vehicle is not the registered person.

The entry management system 1000 described above determines whether or not to permit the vehicle to pass through the vehicle entrance, by using at the vehicle entrance the vehicle image captured by the first imaging unit 1200, the person image captured by the second imaging unit 1400, and the registration information stored in advance in the storage unit 1100. This eliminates a need for the target person to get out of the target vehicle and fill out a document at the vehicle entrance so as to entry the entry restricted area. Therefore, the target person is able to enter the entry restricted area with him staying in the target vehicle. Therefore, a time required to enter the entry restricted area is reduced. As a result, it is less likely that a large number of the target vehicles that desire to enter the entry restricted area are stuck at the vehicle entrance (resulting in traffic jams). Therefore, the entry management system 1000 is capable of solving a technical problem that a large number of the target vehicles that desire to enter the entry restricted area may be stuck at the vehicle entrance.

In addition, the entry management system 1000 permits the target vehicle to pass through the vehicle entrance, when the target vehicle is determined to be the registered vehicle and the target person is determined to be the registered person. Therefore, as compared with a case where the target vehicle is permitted to pass through the vehicle entrance even when the target vehicle is determined to be the registered vehicle, but the target person is not determined to be the registered person, the entry management system 1000 is capable of more properly preventing a suspicious target person from entering the entry restricted area. Similarly, as compared with a case where the target vehicle is permitted to pass through the vehicle entrance even when the target person is determined to be the registered person, but the target vehicle is not determined to be the registered vehicle, it is possible to more properly prevent the suspicious target person from entering the entry restricted area. Therefore, the entry management system 1000 is capable of solving a technical problem that the suspicious target person may enter the entry restricted area.

(2) Second Example Embodiment

Next, an entry management system, an entry management method, and a recording medium in a second example embodiment will be described. The following describes the entry management system, the entry management method, and the recording medium in the second example embodiment, by using an entry management system SYS to which the entry management system, the entry management method, and the recording medium in the second example are applied.

The entry management system SYS manages/controls entry/admission to an entry restricted area 9 of a target person P who enters the entry restricted area 9 in a target vehicle V. In addition, the entry management system SYS may monitor actions in the entry restricted area 9 of the target person P who has entered the entry restricted area 9. In addition, the entry management system SYS may manage an exit from the entry restricted area 9 of the target person P who has entered the entry restricted area 9.

The second example embodiment describes an example in which the entry restricted area 9 is a factory. In this situation, the entry management system SYS may manage/control entry/admission to the factory of the target person P who enters the factory in the target vehicle V. In addition, the entry management system SYS may manage actions in the factory of the target person P who has entered the factory. In addition, the entry management system SYS may manage an exit from the factory of the target person P who has entered the factory.

The entry restricted area 9, however, is not limited to the factory. The entry restricted area 9 may be an arbitrary area as long as it is an area where free entry of the target person is restricted. For example, another example of the entry restricted area 9 may be at least one of a corporate office, a school, a theme park, and an airport.

Such an entry management system SYS will be described below.

(2-1) Configuration of Entry Management System SYS

First, a configuration of the entry management system SYS in the second example embodiment will be described.

(2-1-1) Overall Configuration of Entry Management System SYS

Figure 2:
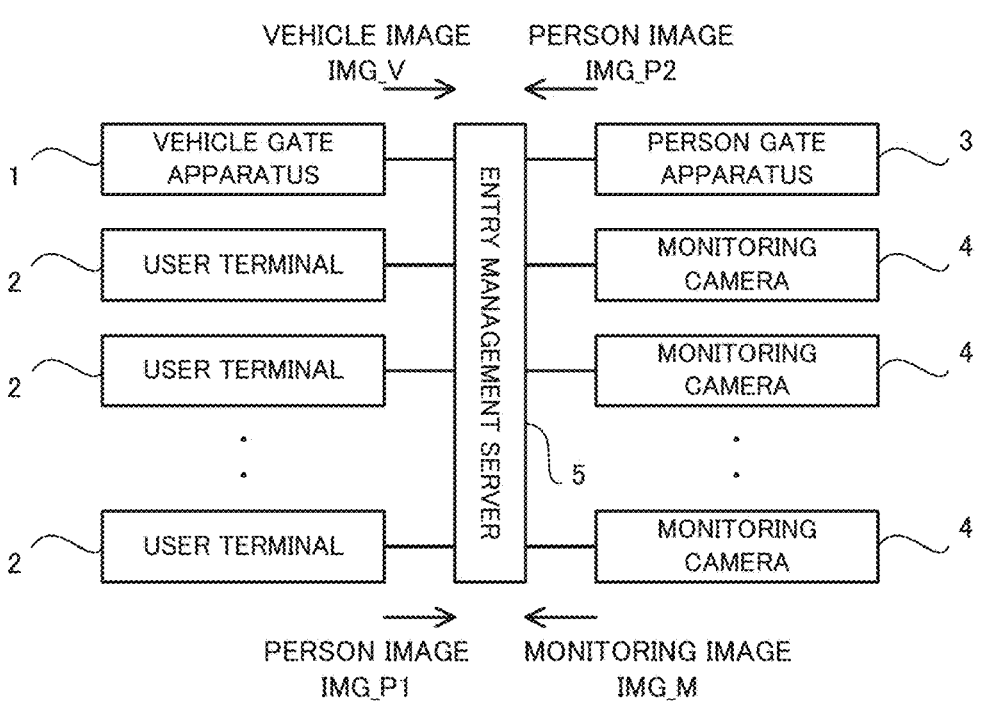
FIG. 2 is a block diagram illustrating an overall configuration of an entry management system in a second example embodiment.
Figure 3:
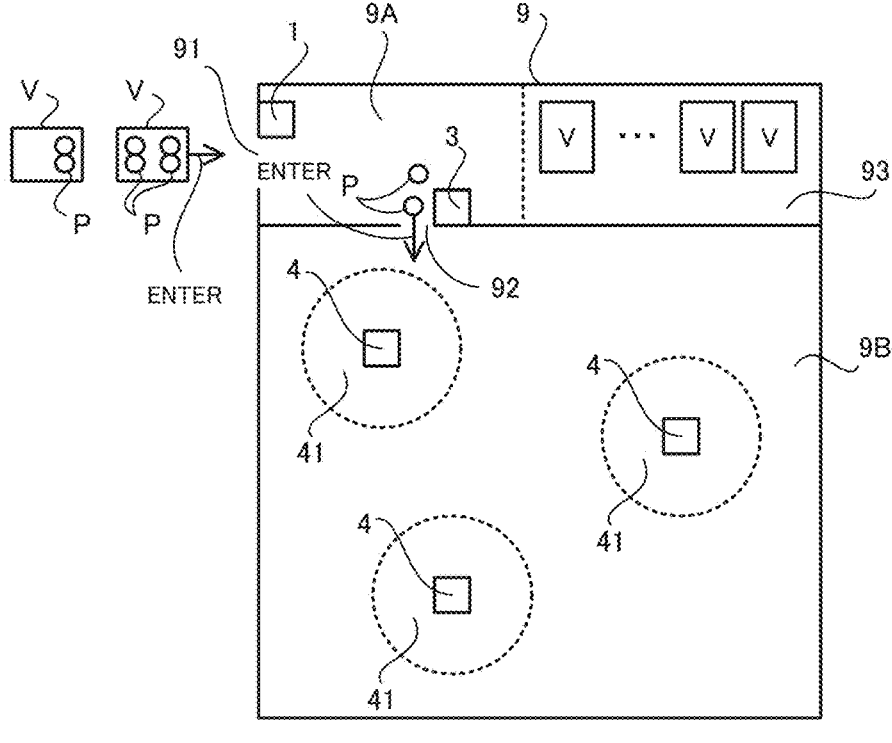
FIG. 3 is a floor plan of an entry restricted area where a target person enters.

First, with reference to FIG. 2 and FIG. 3, an overall configuration of the entry management system SYS in the second example embodiment will be described. FIG. 2 is a block diagram illustrating the overall configuration of the entry management system SYS in the second example embodiment. FIG. 3 is a floor plan of the entry restricted area 9 area where the target person enters.

As illustrated in FIG. 2 and FIG. 3, the entry management system SYS includes a vehicle gate apparatus 1, a user terminal 2, a person gate apparatus 3, a monitoring camera 4 that is a specific example of the "fourth imaging unit" described in Supplementary Note later, and an entry management server 5. In the example illustrated in FIG. 2, the entry management system SYS includes a plurality of user terminals 2, but may include a single user terminal 2. Furthermore, in the example illustrated in FIG. 2, the entry management system SYS includes a plurality of monitoring cameras 4, but may include a single monitoring camera 4.

As illustrated in FIG. 3, the vehicle gate apparatus 1 is disposed at a vehicle entrance 91 through which the target vehicle V should pass to enter the entry restricted area 9. The target vehicle V enters the entry restricted area 9 (especially, a first restricted area 9A in the entry restricted area 9) from an area outside the entry restricted area 9 through the vehicle entrance 91. The vehicle gate apparatus 1 generates a vehicle image IMG_V in which the target vehicle V is captured, by imaging the target vehicle V located at the vehicle entrance 91 to enter the entry restricted area 9. The vehicle gate apparatus 1 transmits the generated vehicle image IMG_V to the entry management server 5.

The vehicle entrance 91 may be used as a vehicle exit through which the target vehicle V should pass to leave the entry restricted area 9. The target vehicle V may leave the entry restricted area 9 to an area outside the entry restricted area 9 through the vehicle entrance 91. The vehicle gate apparatus 1 may generate the vehicle image IMG_V in which the target vehicle V is captured, by imaging the target vehicle V located at the vehicle entrance 91 to leave the entry restricted area 9.

The vehicle entrance 91, however, may not be used as the vehicle exit through which the target vehicle V should pass to leave the entry restricted area 9. The entry restricted area 9 may be provided with a vehicle exit through which the target vehicle V should pass to leave the entry restricted area 9, separately from the vehicle entrance 91. In this instance, the vehicle gate apparatus 1 described above may be disposed at the vehicle exit. The following describes an example in which the vehicle entrance 91 is used as the vehicle exit through which the target vehicle V should pass to leave the entry restricted area 9.

The user terminal 2 is an information terminal (e.g., a smartphone or a tablet terminal) possessed by the target person P who enters the entry restricted area 9. Therefore, the entry management system SYS may include the same number of user terminals 2 as the number of the target persons P who enter the entry restricted area 9. However, one user terminal 2 may be shared by two or more target persons P. The user terminal 2 generates a person image IMG_P1 in which the target person P is captured, by imaging the target person P in the target vehicle V located at the vehicle entrance 91. For example, the user terminal 2 may generate the person image IMG_P1 by imaging the target person P in the target vehicle V who intends to enter the entry restricted area 9 through the vehicle entrance 91. For example, the user terminal 2 may generate the person image IMG_P1 by imaging the target person P in the target vehicle V who intends to leave the entry restricted area 9 through the vehicle entrance 91. The user terminal 2 transmits the created person image IMG_P1 to the entry management server 5.

As illustrated in FIG. 3, the person gate apparatus 3 is disposed at a person entrance 92 in the entry restricted area 9. The target vehicle V that has passed through the vehicle entrance 91 is parked in a parking lot 93 in the entry restricted area 9 (especially, the first restricted area 9A). The target person P passes through the person entrance 92 after getting off the target vehicle V. The target person P enters a second restricted area 9B in the entry restricted area 9 from the first restricted area 9A in the entry restricted area 9 through the person entrance 92. In this instance, the person entrance 92 may be regarded as a person entrance through which the target person P should pass to enter the second restricted area 9B. The person gate apparatus 3 generates a person image IMG_P2 in which the target person P is captured, by imaging the target person P located at the person entrance 92 to enter the second restricted area 9B. The person gate apparatus 3 transmits the generated person image IMG_P2 to the entry management server 5.

The person entrance 92 may be used as a person exit through which the target person P should pass to leave the second restricted area 9B. The target person P may leave the second restricted area 9B to the first restricted area 9A through the person entrance 92. The person gate apparatus 3 may generate the person image IMG_P2 in which the target person P is captured, by imaging the target person P located at the person entrance 92 to leave the second restricted area 9B.

The person entrance 92, however, may not be used as the person exit through which the target person P should pass to leave the second restricted area 9B. The entry restricted area 9 may be provided with a person exit through which the target person P should pass to leave the second restricted area 9B, separately from the person entrance 92. In this instance, the person gate apparatus 3 described above may be disposed at the person exit. The following describes an example in which the person entrance 92 is used as the person exit through which the target person P should pass to leave the second restricted area 9B.

The monitoring camera 4 is disposed in the entry restricted area 9. In the example illustrated in FIG. 3, each of a plurality of monitoring cameras 4 is disposed in the second restricted area 9B (i.e., an area where the target person P who has passed through the person entrance 92, enters) in the entry restricted area 9. At least one of the plurality of monitoring cameras 4, however, may be disposed in the first restricted area 9A (i.e., an area where the target person P who has passed through the vehicle entrance 91, but has not yet passed through the person entrance 92, enters) in the entry restricted area 9. The monitoring camera 4 generates a monitoring image IMG_M in which a scene of an imaging range 41 of the monitoring camera 4 is captured, by imaging the imaging range 41. The monitoring camera 4 transmits the generated monitoring image IMG_M to the entry management server 5.

The entry management server 5 performs a vehicle entry management operation for managing/controlling the entry/admission of the target vehicle V to the entry restricted area 9 (especially, the first restricted area 9A) through the vehicle entrance 91. In order to perform the vehicle entry management operation, the entry management server 5 acquires the vehicle image IMG_V from the vehicle gate apparatus 1 and acquires the person image IMG_P1 from the user terminal 2. Based on the vehicle image IMG_V, the entry management server 5 determines whether or not the target vehicle V located at the vehicle entrance 91 is a registered vehicle V_R that is scheduled to enter the entry restricted area 9. Furthermore, based on the person image IMG_P1, the entry management server 5 determines whether or not the target person P in the target vehicle V is a registered person P_R who is scheduled to enter the entry restricted area 9. When the target vehicle V is determined to be the registered vehicle V_R and the target person P is determined to be the registered person P_R, the entry management server 5 permits the target vehicle V to pass through the vehicle entrance 91. That is, the entry management server 5 permits the target vehicle V and the target person P in the target vehicle V to enter the entry restricted area 9 (especially, the first restricted area 9A) through the vehicle entrance 91. On the other hand, when the target vehicle V is determined to be not the registered vehicle V_R, the entry management server 5 does not permit the target vehicle V to pass through the vehicle entrance 91. In addition, when the target person P is determined to be not the registered person P_R, the entry management server 5 does not permit the target vehicle V to pass through the vehicle entrance 91. That is, the entry management server 5 does not permit the target vehicle V and the target person P in the target vehicle V to enter the entry restricted area 9 (especially, the first restricted area 9A) through the vehicle entrance 91.

Furthermore, the entry management server 5 performs a person entry management operation for managing/controlling the entry/admission of the target person P to the second restricted area 9B through the person entrance 92. In order to perform the person entry management operation, the entry management server 5 acquires the person image IMG_P2 from the person gate apparatus 3. Based on the person image IMG_P2, the entry management server 5 determines whether or not the target person P located at the person entrance 92 is the registered person P_R who is scheduled to enter the entry restricted area 9. When the target person P is determined to be the registered person P_R, the entry management server 5 permits the target person P to pass through the person entrance 92. That is, the entry management server 5 permits the target person P to enter the second restricted area 9B through the person entrance 92. On the other hand, when the target person P is determined to be not the registered person P_R, the entry management server 5 does not permit the target person P to pass through the person entrance 92. That is, the entry management server 5 does not permit the target person P to enter the second restricted area 9B through the person entrance 92.

Furthermore, the entry management server 5 performs a monitoring operation for monitoring at least one of the target vehicles V and the target person P located in the entry restricted area 9. In order to perform the monitoring operation, the entry management server 5 acquires the monitoring image IMG_M from the monitoring camera 4. Based on the monitoring image IMG_M, the entry management server 5 monitors at least one of the target vehicles V and the target person P located in the entry restricted area 9.

Furthermore, the entry management server 5 performs a person exit management operation for managing/controlling the exit of the target person P from the second restricted area 9B through the person entrance 92. In order to perform the person exit management operation, the entry management server 5 acquires the person image IMG_P2 from the person gate apparatus 3. Based on the person image IMG_P2, the entry management server 5 determines whether or not the target person P located at the person entrance 92 is the registered person P_R. When the target person P is determined to be the registered person P_R, the entry management server 5 permits the target person P to pass through the person entrance 92. That is, the entry management server 5 permits the target person P to leave the second restricted area 9B through the person entrance 92. On the other hand, when the target person P is determined to be not the registered person P_R, the entry management server 5 does not permit the target person P to pass through the person entrance 92. That is, the entry management server 5 does not permit the target person P to leave the second restricted area 9B through the person entrance 92.

Furthermore, the entry management server 5 performs a vehicle exit management operation for managing/controlling the exit of the target vehicle V from the entry restricted area 9 (especially, the first restricted area 9A) via the vehicle entrance 91. In order to perform the vehicle exit management operation, the entry management server 5 acquires the vehicle image IMG_V from the vehicle gate apparatus 1 and acquires the person image IMG_P1 from the user terminal 2. Based on the vehicle image IMG_V, the entry management server 5 determines whether or not the target vehicle V located at the vehicle entrance 91 is the registered vehicle V_R. Furthermore, based on the person image IMG_P1, the entry management server 5 determines whether or not the target person P in the target vehicle V is the registered person P_R. When the target vehicle V is determined to be the registered vehicle V_R and the target person P is determined to be the registered person P_R, the entry management server 5 permits the target vehicle V to pass through the vehicle entrance 91. That is, the entry management server 5 permits the target vehicle V and the target person P in the target vehicle V to leave the entry restricted area 9 (especially, the first restricted area 9A) through the vehicle entrance 91. On the other hand, when the target vehicle V is determined to be not the registered vehicle V_R, the entry management server 5 does not permit the target vehicle V to pass through the vehicle entrance 91. In addition, when the target person P is determined to be not the registered person P_R, the entry management server 5 does not permit the target vehicle V to pass through the vehicle entrance 91. That is, the entry management server 5 does not permit the target vehicle V and the target person P in the target vehicle V to leave the entry restricted area 9 (especially, the first restricted area 9A) through the vehicle entrance 91.

(2-1-2) Configuration of Vehicle Gate Apparatus 1

Figure 4:
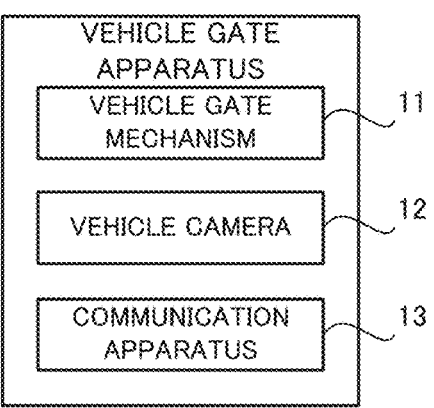
FIG. 4 is a block diagram illustrating a configuration of a vehicle gate apparatus in the second example embodiment.

Next, with reference to FIG. 4, a configuration of the vehicle gate apparatus 1 will be described. FIG. 4 is a block diagram illustrating the configuration of the vehicle gate apparatus 1.

As illustrated in FIG. 4, the vehicle gate apparatus 1 includes a vehicle gate mechanism 11, a vehicle camera 12 that is a specific example of the "first imaging unit" described in Supplementary Note later, and a communication apparatus 13.

The vehicle gate mechanism is an apparatus that is configured to control the passage of the target vehicle V at the vehicle entrance 91. A state of the vehicle gate mechanism 11 is controlled on the basis of a vehicle gate control signal transmitted from the entry management server 5. In the second example embodiment, the state of the vehicle gate mechanism 11 is switchable between a closing state in which the target vehicle V is not capable of passing through the vehicle entrance 91 and an opening state in which the target vehicle V is capable of passing through the vehicle entrance 91. For example, when the vehicle gate mechanism 11 includes a gate bar, the state of the vehicle gate mechanism 11 may be switchable between a closing state in which the gate bar is closed and an opening state in which the gate bar is open.

The vehicle camera 12 generates the vehicle image IMG_V in which the target vehicle V is captured, by imaging the target vehicle V located at the vehicle entrance 91. The vehicle camera 12 transmits the generated vehicle image IMG_V to the entry management server 5.

The communication apparatus 13 is configured to communicate with the entry management server 5 through a not-illustrated communication network. In the second example embodiment, the communication apparatus 13 transmits the vehicle image IMG_V captured by the vehicle camera 12, to the entry management server 5. That is, the vehicle camera 12 transmits the vehicle image IMG_V to the entry management server 5 by using the communication apparatus 13. In addition, in the second example embodiment, the communication apparatus 13 receives the vehicle gate control signal from the entry management server 5. The state of the vehicle gate mechanism 11 is controlled on the basis of the vehicle gate control signal received by the communication apparatus 13.

(2-1-3) Configuration of User Terminal 2

Figure 5:
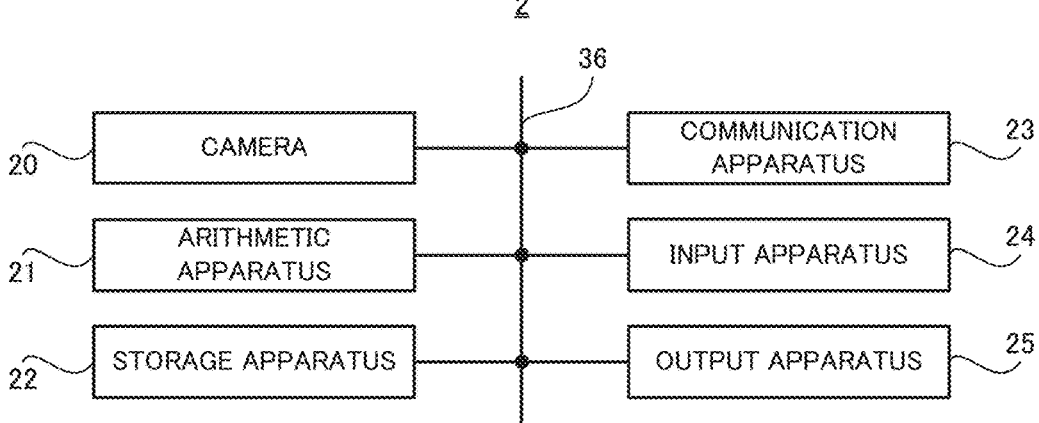
FIG. 5 is a block diagram illustrating a configuration of a user terminal in the second example embodiment.

Next, with reference to FIG. 5, a configuration of the user terminal 2 will be described. FIG. 5 is a block diagram illustrating the configuration of the user terminal 2.

As illustrated in FIG. 5, the user terminal 2 includes a camera 20 that is a specific example of the "second imaging unit" described in Supplementary Note later, an arithmetic apparatus 21, a storage apparatus 22, and a communication apparatus 23. The user terminal 2 may further include an input apparatus 24 and an output apparatus 25. The user terminal 2, however, may not include at least one of the input apparatus 24 and the output apparatus 25. The camera 20, the arithmetic apparatus 21, the storage apparatus 22, the communication apparatus 23, the input apparatus 24, and the output apparatus 25 may be connected through a data bus 26.

The camera 20 generates the person image IMG_P1 by imaging the target person P. Especially, as described above, the camera 20 generates the person image IMG_P1 by imaging the target person P in the target vehicle V located at the vehicle entrance 91. The camera 20 transmits the generated person image IMG_P1 to the entry management server 5.

The arithmetic apparatus 21 includes at least one of a CPU (Central Processing Unit), a GPU (Graphics Processing Unit), a FPGA (Field Programmable Gate Array), for example. The arithmetic apparatus 21 reads a computer program. For example, the arithmetic apparatus 21 may read a computer program stored in the storage apparatus 22. For example, the arithmetic apparatus 21 may read a computer program stored by a computer-readable and non-transitory recording medium, by using a not-illustrated recording medium reading apparatus provided in the user terminal 2. The arithmetic apparatus 21 may acquire (i.e., download or read) a computer program from a not-illustrated apparatus disposed outside the user terminal 2, through the communication apparatus 23 (or another communication apparatus). The arithmetic apparatus 21 executes the read computer program. Consequently, a logical functional block for performing an operation to be performed by the user terminal 2 is realized or implemented in the arithmetic apparatus 21. That is, the arithmetic apparatus 21 is allowed to function as a control unit for realizing or implementing the logical functional block for performing an operation (in other words, processing) to be performed by the user terminal 2.

The storage apparatus 22 is configured to store desired data. For example, the storage apparatus 22 may temporarily store a computer program to be executed by the arithmetic apparatus 21. The storage apparatus 22 may temporarily store data that are temporarily used by the arithmetic apparatus 21 when the arithmetic apparatus 21 executes the computer program. The storage apparatus 22 may store data that are stored by the user terminal 2 for a long time. Especially in the present example embodiment, the storage apparatus 22 may store an entry history DB 421. The storage apparatus 22 may include at least one of a RAM (Random Access Memory), a ROM (Read Only Memory), a hard disk apparatus, a magneto-optical disk apparatus, a SSD (Solid State Drive), and a disk array apparatus. That is, the storage apparatus 22 may include a non-transitory recording medium.

The communication apparatus 23 is configured to communicate with the entry management server 5 through a not-illustrated communication network. In the second example embodiment, the communication apparatus 23 transmits the person image IMG_P1 captured by the camera 20, to the entry management server 5. That is, the camera 20 transmits the person image IMG_P1 to the entry management server 5 by using the communication apparatus 23.

The input apparatus 24 is an apparatus that receives an input of information to the user terminal 2 from an outside of the user terminal 2. For example, the input apparatus 24 may include an operating apparatus (e.g., at least one of a keyboard, a mouse, and a touch panel) that is operable by an operator of the user terminal 2. For example, the input apparatus 24 may include a reading apparatus that is configured to read information recorded as data on a recording medium that is externally attachable to the user terminal 2.

The output apparatus 25 is an apparatus that outputs information to the outside of the user terminal 2. For example, the output apparatus 25 may output information as an image. That is, the output apparatus 25 may include a display apparatus (a so-called display) that is configured to display an image indicating the information that is desirably outputted. For example, the output apparatus 25 may output information as audio/sound. That is, the output apparatus 25 may include an audio apparatus (a so-called speaker) that is configured to output the audio/sound. For example, the output apparatus 25 may output information onto a paper surface. That is, the output apparatus 25 may include a print apparatus (a so-called printer) that is configured to print desired information on the paper surface.

(2-1-4) Configuration of Person Gate Apparatus 3

Figure 6:
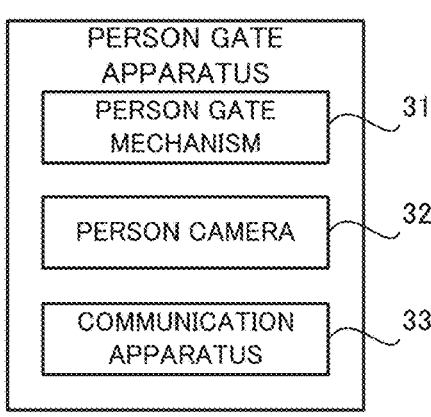
FIG. 6 is a block diagram illustrating a configuration of a person gate apparatus in the second example embodiment.

Next, with reference to FIG. 6, a configuration of the person gate apparatus 3 will be described. FIG. 6 is a block diagram illustrating the configuration of the person gate apparatus 3.

As illustrated in FIG. 6, the person gate apparatus 3 includes a person gate mechanism 31, a person camera 32 that is a specific example of the "third imaging unit" described in Supplementary Note later, and a communication apparatus 33.

The person gate mechanism 31 is an apparatus that is configured to control the passage of the target person P at the person entrance 92. A state of the person gate mechanism 31 is controlled on the basis of a person gate control signal transmitted from the entry management server 5. In the second example embodiment, the state of the person gate mechanism 31 is switchable between a closing state in which the target person P is not able to pass through the person entrance 92 and an opening state in which the target person P is able to pass through the person entrance 92. For example, when the person gate mechanism 31 includes a gate bar, the state of the person gate mechanism 31 may be switchable between a closing state in which the gate bar is closed and an opening state in which the gate bar is open.

The person camera 32 generates the person image IMG_P2 in which the target person P is captured, by imaging the target person P located at the person entrance 92. The person camera 32 transmits the generated person image IMG_P to the entry management server 5.

The communication apparatus 33 is configured to communicate with the entry management server 5 through a not-illustrated communication network. In the second example embodiment, the communication apparatus 33 transmits the person image IMG_P2 captured by the person camera 32, to the entry management server 5. That is, the person camera 32 transmits the person image IMG_P2 to the entry management server 5 by using the communication apparatus 33. In addition, in the second example embodiment, the communication apparatus 33 receives the person gate control from the entry management server 5. The state of the person gate mechanism 31 is controlled on the basis of the person gate control signal received by the communication apparatus 33.

(2-1-5) Configuration of Entry Management Server 5

Figure 7:
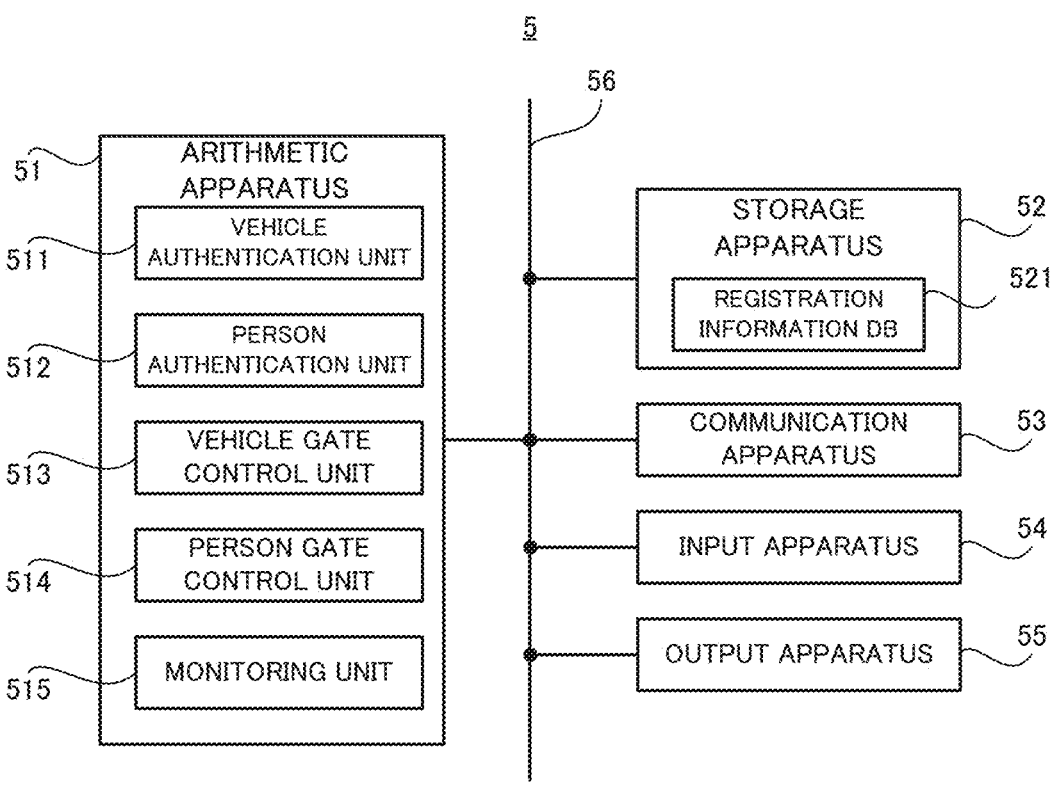
FIG. 7 is a block diagram illustrating a configuration of an entry management server in the second example embodiment.

Next, with reference to FIG. 7, a configuration of the entry management server 5 will be described. FIG. 7 is a block diagram illustrating the configuration of the entry management server 5.

As illustrated in FIG. 7, the entry management server 5 includes an arithmetic apparatus 51, a storage apparatus 52, and a communication apparatus 53. The entry management server 5 may further include an input apparatus 54 and an output apparatus 55. The entry management server 5, however, may not include at least one of the input apparatus 54 and the output apparatus 55. The arithmetic apparatus 51, the storage apparatus 52, the communication apparatus 53, the input apparatus 54, and the output apparatus 55 may be connected through a data bus 56.

The arithmetic apparatus 51 includes at least one of a CPU, a GPU, a FPGA, for example. The arithmetic apparatus 51 reads a computer program. For example, the arithmetic apparatus 51 may read a computer program stored in the storage apparatus 52. For example, the arithmetic apparatus 51 may read a computer program stored by a computer-readable and non-transitory recording medium, by using a not-illustrated recording medium reading apparatus provided in the entry management server 5. The arithmetic apparatus 51 may acquire (i.e., download or read) a computer program from a not-illustrated apparatus disposed outside the entry management server 5, through the communication apparatus 53 (or another communication apparatus). The arithmetic apparatus 51 executes the read computer program. Consequently, a logical functional block for performing an operation to be performed by the entry management server 5 is realized or implemented in the arithmetic apparatus 51. That is, the arithmetic apparatus 51 is allowed to function as a control unit for realizing or implementing the logical functional block for performing an operation (in other words, processing) to be performed by the entry management server 5.

As described above, in the second example embodiment, the entry management server 5 performs the vehicle entry management operation, the person entry management operation, the monitoring operation, the person exit management operation, and the vehicle exit management operation. Therefore, a logical functional block for performing the vehicle entry management operation, the person entry management operation, the monitoring operation, the person exit management operation, and the vehicle exit management operation is realized or implemented in the arithmetic apparatus 51. FIG. 7 illustrates an example of the logical functional block realized or implemented in the arithmetic apparatus 51 to perform the vehicle entry management operation, the person entry management operation, the monitoring operation, the person exit management operation, and the vehicle exit management operation. As illustrated in FIG. 7, the arithmetic apparatus 51 includes a vehicle authentication unit 511 that is a specific example of the "first determination unit" described in Supplementary Note later, a person authentication unit 512 that is a specific example of the "second determination unit" and the "third determination unit" described in Supplementary Note later, a vehicle gate control unit 513 that is a specific example of the "entry management unit" described in Supplementary Note later, a person gate control unit 514 that is a specific example of the "entry management unit" described in Supplementary Note later, and a monitoring unit 515 that is a specific example of the "fourth determination unit" and the "alerting unit" described in Supplementary Note later. The vehicle authentication unit 511, the person authentication unit 512, and the vehicle gate control unit 513 are mainly used to perform the vehicle entry management operation and the vehicle exit management operation. The person authentication unit 512 and the person gate control unit 514 are mainly used to perform the person entry management operation and the person exit management operation. The monitoring unit 515 is mainly used to perform the monitoring operation.

The storage apparatus 52 is configured to store desired data. For example, the storage apparatus 52 may temporarily store a computer program to be executed by the arithmetic apparatus 51. The storage apparatus 52 may temporarily store data that are temporarily used by the arithmetic apparatus 51 when the arithmetic apparatus 51 executes the computer program. The storage apparatus 52 may store data that are stored by the arithmetic apparatus 51 for a long time. The storage apparatus 52 may include at least one of a RAM, a ROM, a hard disk apparatus, a magneto-optical disk apparatus, a SSD, and a disk array apparatus. That is, the storage apparatus 52 may include a non-transitory recording medium.

Especially in the second example embodiment, the storage apparatus 52 may store a registration information DB (Database) 521 including information about the registered vehicle V_R that is scheduled to enter the entry restricted area 9 and the registered person P_R who is scheduled to enter the entry restricted area 9.

An example of a data structure of the registration information DB 521 is illustrated in FIG. 8A to FIG. 8C. As illustrated in FIG. 8A, the registration information DB 521 includes a plurality of registration information records 5210. The registration information record 5210 includes a record ID 5211 for identifying the registration information record 5210, vehicle information 5212, and person information 5213. That is, the registration information record 5210 is information in which the vehicle information 5212 is associated with the person information 521 by the record ID 5211.

The vehicle information 5212 is information about the registered vehicle V_R. The plurality of registration information records 5210 may respectively include a plurality of pieces of vehicle information 5212 about a plurality of different registered vehicles V_R. An example of a data structure of the vehicle information 5212 is illustrated in FIG. 8B. As illustrated in FIG. 8B, the vehicle information 5212 may include vehicle number information about a vehicle number of the registered vehicle V_R (i.e., a vehicle number described in a license plate). The vehicle information 5212 may include number-of-persons information about the number of the registered persons P_R who are scheduled to enter the entry restricted area 9 in the registered vehicle V_R. The vehicle information 5212 may include manager information about a manager of the registered vehicle V_R. The manager information may include information about a name of the manager, information about where the manager belongs to, and information about contacts of the manager. The vehicle information 5212 may include vehicle permitted area information about a vehicle entry permitted area in which the registered vehicle V_R is permitted to enter, in the entry restricted area 9.

The person information 5213 is information about the registered person P who is scheduled to enter the entry restricted area 9 in the registered vehicle V_R corresponding to the vehicle information 5212. When only one registered person P is scheduled to enter the entry restricted area 9 in a certain registered vehicle V_R, the person information 5213 may include information about the one registered person P_R. When only a plurality of registered persons P are scheduled to enter the entry restricted area 9 in a certain registered vehicle V_R, the person information 5213 may include information about each of the plurality of registered persons P_R.

An example of a data structure of the person information 5213 is illustrated in FIG. 8C. As illustrated in FIG. 8C, the person information 5213 may include a person ID for identifying the registered person P_R. The person information 5213 may include a registration image that is an image of the registered person P_R. The person information 5213 may include person permitted area information about a person entry permitted area in which the registered person P_R is permitted to enter, in the entry restricted area 9. The person information 5213 may include attendance information indicating whether or not the registered person P_R has attended safety training in the factory that is the entry restricted area 9. The attendance information may further include information about a date and time when the registered person P_R attended the safety training.

A registration information record 5210 included in the registration information DB 521 may be registered in advance by the manager of the registered vehicle V_R or the registered person P_R. For example, the manager of the registered vehicle V_R or the registered person P_R may transmit to the entry management server 5 the vehicle information 5212 and the person information 5213 together with an application request for applying for the entry to the entry restricted area 9.

The entry management server 5 may newly register the registration information record 5210 including the vehicle information 5212 and the person information 5213 transmitted from the manager of the registered vehicle V_R or the registered person P_R, in the registration information DB 521.

Referring back to FIG. 7, the communication apparatus 53 is configured to communicate with the vehicle gate apparatus 1, the user terminal 2, the person gate apparatus 3, and the monitoring camera 4 through a not-illustrated communication network. In the second example embodiment, the communication apparatus 53 receives the vehicle image IMG_V from the vehicle gate apparatus 1. In addition, the communication apparatus 53 transmits the vehicle gate control signal for controlling the state of the vehicle gate mechanism 11, to the vehicle gate apparatus 1. In addition, the communication apparatus 53 receives the person image IMG_P1 from the user terminal 2. In addition, the communication apparatus 53 receives the person image IMG_P2 from the person gate apparatus 3. Furthermore, the communication apparatus 53 transmits the person gate control signal for controlling the state of the person gate mechanism 31, to the person gate apparatus 3. In addition, the communication apparatus 53 receives the monitoring image IMG_M from the monitoring camera 4.

The input apparatus 54 is an apparatus that receives an input of information to the entry management server 5 from an outside of the entry management server 5. For example, the input apparatus 54 may include an operating apparatus (e.g., at least one of a keyboard, a mouse, and a touch panel) that is operable by an operator of the entry management server 5. For example, the input apparatus 54 may include a reading apparatus that is configured to read information recorded as data on a recording medium that is externally attachable to the entry management server 5.

The output apparatus 55 is an apparatus that outputs information to the outside of the entry management server 5. For example, the output apparatus 55 may output information as an image. That is, the output apparatus 55 may include a display apparatus (a so-called display) that is configured to display an image indicating the information that is desirably outputted. For example, the output apparatus 55 may output information as audio/sound. That is, the output apparatus 55 may include an audio apparatus (a so-called speaker) that is configured to output the audio/sound. For example, the output apparatus 55 may output information onto a paper surface. That is, the output apparatus 55 may include a print apparatus (a so-called printer) that is configured to print desired information on the paper surface.

(2-2) Operations Performed by Entry Management Server 5

Next, the operations performed by the entry management server 5 will be described. As described above, the entry management server 5 performs each of the vehicle entry management operation, the person entry management operation, the monitoring operation, the person exit management operation, and the vehicle exit management operation. Therefore, hereinafter, the vehicle entry management operation, the person entry management operation, the monitoring operation, the person exit management operation, and the vehicle exit management operation will be described in order.

(2-2-1) Vehicle Entry Management Operation

First, with reference to FIG. 9, a flow of the vehicle entry management operation will be described. FIG. 9 is a flow-chart illustrating the flow of the vehicle entry management operation.

As illustrated in FIG. 9, the vehicle authentication unit 511 acquires the vehicle image IMG_V from the vehicle gate apparatus 1 (step S101). The vehicle gate apparatus 1 images the target vehicle V located at the vehicle entrance 91, by using the vehicle camera 12 at the timing when the target vehicle V arrives at the vehicle entrance 91. Specifically, when the target vehicle V enters the entry restricted area 9 through the vehicle entrance 91, the vehicle camera 12 images the target vehicle V located outside the entry restricted area 9. The imaging of the target vehicle V located outside the entry restricted area 9 by the vehicle camera 12, may cause the entry management server 5 to start the vehicle entry management operation illustrated in FIG. 9.

Thereafter, the vehicle authentication unit 511 authenticates the target vehicle V by using the vehicle image IMG_V acquired in the step S101 and the registration information DB 521 stored in the storage apparatus 52 (step S102). In the second example embodiment, an operation of authenticating the target vehicle V means an operation of determining whether or not the target vehicle V is the registered vehicle V_R. In order to authenticate the target vehicle V, the vehicle authentication unit 511 compares the vehicle number of the target vehicle V captured in the vehicle image IMG_V with the vehicle number of the registered vehicle V_R indicated by the vehicle information 5212 included in the registration information DB 521. When the registration information DB 521 includes the vehicle information 5212 indicating the vehicle number of the registered vehicle V_R that is the same as the vehicle number of the target vehicle V, the vehicle authentication unit 511 determines that the target vehicle V is the registered vehicle V_R. That is, the vehicle authentication unit 511 determines that the authentication of the target vehicle V is successful. On the other hand, when the registration information DB 521 does not include the vehicle information 5212 indicating the vehicle number of the registered vehicle V_R that is the same as the vehicle number of the target vehicle V, the vehicle authentication unit 511 determines that the target vehicle V is not the registered vehicle V_R. That is, the vehicle authentication unit 511 determines that the authentication of the target vehicle V is failed.

As a result of the authentication in the step S102, when the authentication of the target vehicle V is failed (the step S103: No), the target vehicle V located at the vehicle entrance 91 is not scheduled to enter the entry restricted area 9. Therefore, in this instance, the vehicle gate control unit 513 does not permit the target vehicle V to pass through the vehicle entrance 91 (step S109). Specifically, the vehicle gate control unit 513 generates the vehicle gate control signal for setting the state of the vehicle gate mechanism 11 into the closing state. The vehicle gate control unit 513 transmits the generated vehicle gate control signal to the vehicle gate apparatus 1. Consequently, the state of the vehicle gate mechanism 11 is set in the closing state, and the target vehicle V is not capable of passing through the vehicle entrance 91.

When the target vehicle V is not permitted to pass through the vehicle entrance 91, the vehicle gate control unit 513 may output alert information for warning that the target vehicle V is not permitted to pass through the vehicle entrance 91, to a predetermined user. For example, the vehicle gate control unit 513 may output the alert information for warning that the target vehicle V is not permitted to pass through the vehicle entrance 91, to the manager of the target vehicle V (i.e., the registered vehicle V_R), on the basis of the manager information included in the vehicle information 5212. For example, the vehicle gate control unit 513 may output the alert information for warning that the target vehicle V is not permitted to pass through the vehicle entrance 91, to an operator of the entry management system SYS. The user may investigate the target vehicle V that is not permitted to pass through the vehicle entrance 91.

On the other hand, as a result of the authentication in the step S102, when the authentication of the target vehicle V is successful (the step S103: Yes), the person authentication unit 512 acquires the person image IMG_P1 from the user terminal 2 (step S104). Specifically, at the timing when the target vehicle V arrives at the vehicle entrance 91, the user terminal 2 provided by each of the target persons P in the target vehicle V, images each of the target persons P in the target vehicle V by using the camera 20. That is, each of the target persons P in the target vehicle V images each of the target persons P by using the user terminal 2 provided by each of the target persons P. The person authentication unit 512 acquires the same number of person images IMG_P1 as the number of the target persons P in the target vehicle V.

Thereafter, the person authentication unit 512 authenticates the target person P by using each person image IMG_P1 acquired in the step S104 and the registration information DB 521 stored in the storage apparatus 52 (step S105). In the second example embodiment, an operation of authenticating the target person P means an operation of determining whether or not the target person P is the registered person P_R. In order to authenticate the target person P, the person authentication unit 512 acquires, from the registration information DB 521, the person information 5213 associated with the vehicle information 5212 about the target vehicle V authenticated in the step S102. The person authentication unit 512 determines whether or not each of the target persons P is the registered person P_R who is scheduled to enter the entry restricted area 9 in the target vehicle V authenticated in the step S102, by comparing each person image IMG_P1 acquired in the step S104 with the registration image included in the person information 5213. For example, the person authentication unit 512 may extract feature quantities of each of the target persons P (e.g., feature quantities of a face of each of the target persons P) based on each person image IMG_P1, and may extract feature quantities of the registered person P_R (e.g., feature quantities of a face of the registered person P_R) based on the registration image. Thereafter, the person authentication unit 512 may determine that each of the target persons P is the registered person P_R when a degree of similarity between the feature quantities of each of the target persons P and the feature quantities of the registered person P_R exceeds a predetermined threshold. That is, the person authentication unit 512 determines that the authentication of the target person P is successful. On the other hand, when the degree of similarity between the feature quantities of each of the target persons P and the feature quantities of the registered person P_R falls below the predetermined threshold, the person authentication unit 512 may determine that each of the target persons P is not the registered person P_R. That is, the person authentication unit 512 determines that the authentication of the target person P is failed.

As a result of the authentication in the step S105, when the authentication is failed for at least one target person P who is an authentication target in the step S105 (step S106: No), the target person P who is not scheduled to enter the entry restricted area 9, is in the target vehicle V. Therefore, in this instance, the vehicle gate control unit 513 does not permit the target vehicle V to pass through the vehicle entrance 91 (step S109).

On the other hand, as a result of the authentication in the step S105, when the authentication is successful for all the target persons P who are authentication targets in the step S105 (the step S106: Yes), the person authentication unit 512 determines whether or not the number of the target persons P who succeed in the authentication in the step S105 is the same as the number of the registered persons P_R who are scheduled to enter the entry restricted area 9 in the target vehicle V authenticated in the step S102 (step S107). Information about the number of the registered persons P_R who are scheduled to enter the entry restricted area 9 in the target vehicle V, is included in the vehicle information 5212 stored in the storage apparatus 52 as described above.

As a result of the determination in the step S107, when it is determined that the number of the target persons P who succeed in the authentication is not the same as the number of the registered persons P_R (the step S107: No), it is assumed that there is the registered person P_R who is scheduled to enter the entry restricted area 9 in the target vehicle V, but is not actually in the target vehicle V. In this instance, the vehicle gate control unit 513 may not permit the target vehicle V to pass through the vehicle entrance 91 (step S109).

On the other hand, as a result of the determination in the step S107, when it is determined that the number of the target persons P who succeed in the authentication is the same as the number of the registered persons P_R (the step S107: Yes), it is assumed that all the registered persons P_R who are scheduled to enter the entry restricted area 9 in the target vehicle V, are in the target vehicle V. In this instance, the vehicle gate control unit 513 permits the target vehicle V to pass through the vehicle entrance 91 (step S108). Specifically, the vehicle gate control unit 513 generates the vehicle gate control signal for setting the state of the vehicle gate mechanism 11 into the opening state. The vehicle gate control unit 513 transmits the generated vehicle gate control signal to the vehicle gate apparatus 1. Consequently, the state of the vehicle gate mechanism 11 is set in the opening state, and the target vehicle V is capable of passing through the vehicle entrance 91.

(2-2-2) Person Entry Management Operation

Next, a flow of the person entry management operation will be described with reference to FIG. 10. FIG. 10 is a flowchart illustrating the flow of the person entry management operation.

As illustrated in FIG. 10, the person authentication unit 512 acquires the person image IMG_P2 from the person gate apparatus 3 (step S111). The person gate apparatus 3 images the target person P located at the person entrance 92, by using the person camera 32 at the timing when the target person P arrives at the person entrance 92. Specifically, when the target person P enters the second restricted area 9B through the person entrance 92, the person camera 32 images the target person P located outside the second restricted area 9B (i.e., in the first restricted area 9A). The imaging of the target person P located outside the second restricted area 9B by the person camera 32, may cause the entry management server 5 to start the person entry management operation illustrated in FIG. 10.

Then, the person authentication unit 512 authenticates the target person P by using the person image IMG_P2 acquired in the step S111 and the registration information DB 521 stored in the storage apparatus 52 (step S112). In the step S112, the operation of authenticating the target person P may be the same as the operation of authenticating the target person P in the step S105 in FIG. 9 described above. Therefore, a detailed description of the operation of authenticating the target person P in the step S112 in FIG. 10 will be omitted.

As a result of the authentication in the step S112, when the authentication of the target person P is failed (the step S113: No), the target person P located at the person entrance 92 is not scheduled to enter the entry restricted area 9. Therefore, in this case, the person gate control unit 514 does not permit the target person P to pass through the person entrance 92 (step S117). Specifically, the person gate control unit 514 generates the person gate control signal for setting the state of the person gate mechanism 31 into the closing state. The person gate control unit 514 transmits the generated person gate control signal to the person gate apparatus 3. Consequently, the state of the person gate mechanism 31 is set in the closing state, and the target person P is not able to pass through the person entrance 92.

When the target person P is not permitted to pass through the person entrance 92, the person gate control unit 514 may output alert information for warning that the target person P is not permitted to pass through the person entrance 92, to a predetermined user. For example, the person gate control unit 514 may output the alert information for warning that the target person P is not permitted to pass through the person entrance 92, to the manager of the target vehicle V (i.e., the registered vehicle V_R) in which the target person P is, on the basis of the manager information included in the vehicle information 5212. For example, the person gate control unit 514 may output the alert information for warning that the target person P is not permitted to pass through the person entrance 92, to the operator of the entry management system SYS. The user may investigate the target person P who is not permitted to pass through the person entrance 92. On the other hand, as a result of the authentication in the step S112, when the authentication of the target person P is successful (the step S113: Yes), the person gate control unit 514 determines whether or not the authentication of the target person P is successful at the vehicle entrance 91 (step S114).

As a result of the determination in the step S114, when it is determined that the authentication of the target person P is not successful at the vehicle entrance 91 (the step S114: No), the target person P who is not authenticated by the entry management server 5 at the vehicle entrance 91, is located at the person entrance 92. For example, the target person P who unauthorizedly passes through the vehicle entrance 91 without authorized by the entry management server 5 at the vehicle entrance 91 by being hidden in the target vehicle V, may be located at the person entrance 92. In this instance, the person gate control unit 514 does not permit the target person P to pass through the person entrance 92 (step S117).

On the other hand, as a result of the determination in the step S114, when it is determined that the authentication of the target person P is successful at the vehicle entrance 91 (the step S114: Yes), the person gate control unit 514 determines whether or not the target person P has attended the safety training in the factory that is the entry restricted area 9 (step S115). As described above, the person information 5213 stored in the storage apparatus 52 includes the attendance information indicating whether or not the registered person P_R has attended the safety training. In this instance, the person gate control unit 514 may determine whether or not the target person P has attended the safety training, by determining whether or not the target person P is the registered person P_R who has attended the safety training, on the basis of the attendance information.

As a result of the determination in the step S115, when it is determined that the target person P has not attended the safety training (the step S115: No), it is assumed that the target person P should preferably enter the entry restricted area 9 after attending the safety training. In this instance, the person gate control unit 514 does not permit the target person P to pass through the person entrance 92 (step S117). Then, the person gate control unit 514 may encourage the target person P to attend the safety training. For example, when the person gate apparatus 3 includes a display (or any output apparatus), the person gate control unit 514 may control the display to show thereon an image for encouraging the target person P to attend the safety training.

On the other hand, as a result of the determination in the step S115, when it is determined that the target person P has attended the safety training (the step S115: Yes), the person gate control unit 514 permits the target person P to pass through the person entrance 92 (step S116). Specifically, the person gate control unit 514 generates the person gate control signal for setting the state of the person gate mechanism 31 into the opening state. The person gate control unit 514 transmits the generated person gate control signal to the person gate apparatus 3. Consequently, the state of the person gate mechanism 31 is set in the opening state, and the target person P is able to pass through the person entrance 92.

(2-2-3) Monitoring Operation

Next, with reference to FIG. 11, a flow of the monitoring operation will be described. FIG. 11 is a flowchart illustrating the flow of the monitoring operation.

As illustrated in FIG. 11, the monitoring unit 515 acquires the monitoring image IMG_M from the monitoring camera 4 (step S121). The monitoring cameras 4 images the imaging range 41 at a predetermined imaging rate. The generation of the monitoring image IMG_M by the monitoring camera 4, may cause the entry management server 5 to start the monitoring operation illustrated in FIG. 11. The transmission of the monitoring image IMG_M by the monitoring camera 4 to the entry management server 5, may cause the entry management server 5 to start the monitoring operation illustrated in FIG. 11.

Thereafter, the monitoring unit 515 determines whether or not a vehicle (specifically, the target vehicle V that has entered the entry restricted area 9) is captured in the monitoring image IMG_M, by analyzing the monitoring image IMG_M acquired in the step S121 (step S122).

As a result of the determination in the step S122, when it is determined that the target vehicle V is captured in the image IMG_M (the step S122: Yes), the monitoring unit 515 authenticates the target vehicle V by using the monitoring image IMG_M acquired in the step S121 and the registration information DB 521 stored in the storage apparatus 52 (step S123). In the step S123, the operation of authenticating the target vehicle V may be the same as the operation of authenticating the target vehicle V in the step S102 in FIG.

9. Therefore, a detailed description of the operation of authenticating the target vehicle V in the step S123 in FIG. 11 will be omitted.

On the other hand, as a result of the determination in the step S122, when it is determined that the target vehicle V is not captured in the monitoring image IMG_M (the step S122: No), the monitoring unit 515 may not perform the step S123.

Furthermore, the monitoring unit 515 determines whether or not a person (specifically, the target person P who has entered the entry restricted area 9) is captured in the monitoring image IMG_M, by analyzing the monitoring image IMG_M acquired in the step S121 (step S124).

As a result of the determination in the step S124, when it is determined that the target person P is captured in the monitoring image IMG_M (the step S124: Yes), the monitoring unit 515 authenticates the target person P by using the monitoring image IMG_M acquired in the step S121 and the registration information DB 521 stored in the storage apparatus 52 (step S125). In the step S125, the operation of authenticating the target person P may be the same as the operation of authenticating the target person P in the step S105 in FIG. 9. Therefore, a detailed description of the operation of authenticating the target person P in the step S125 in FIG. 11 will be omitted.

On the other hand, as a result of the determination in the step S124, when it is determined that the target person P is not captured in the monitoring image IMG_M (the step S124: No), the monitoring unit 515 may not perform the step S125.

Thereafter, the monitoring unit 515 determines whether or not the target vehicle V authenticated in the step S123 is in an abnormal state (step S126). Furthermore, the monitoring unit 515 determines whether or not the target person P authenticated in the step S125 is in an abnormal state (step S126).

For example, as described above, the registration information DB 521 includes, as a part of the vehicle information 5212, the vehicle permitted area information about the vehicle entry permitted area in which the registered vehicle V_R is permitted to enter, in the entry restricted area 9. In this case, the monitoring unit 515 may determine whether or not the target vehicle V is in the abnormal state, by determining whether or not the target vehicle V authenticated in the step S123 is located in a different area from the vehicle entry permitted area. Specifically, since the target vehicle V authenticated in the step S123 is captured by the monitoring camera 4, the monitoring unit 515 is capable of identifying a current position of the target vehicle V from a position of the imaging range 41 of the monitoring camera 4. Information about the position of the imaging range 41 of the monitoring camera 4 may be information known to the monitoring unit 515. Furthermore, the monitoring unit 515 is capable of identifying the vehicle entry permitted area of the registered vehicle V_R corresponding to the target vehicle V, on the basis of the registration information DB 521. Consequently, the monitoring unit 515 is capable of determining whether or not the target vehicle V is located in a different area from the vehicle entry permitted area. When the target vehicle V is determined to be located in a different area from the vehicle entry permitted area, it is assumed that the target vehicle V is located in an area where the target vehicle V is not permitted to enter. In this instance, the monitoring unit 515 may determine that the target vehicle V is in the abnormal state.

For example, as described above, the registration information DB 521 includes, as a part of the person information 5213, the person permitted area information about the person entry permitted area in which the registered person P_R is permitted to enter, in the entry restricted area 9. In this instance, the monitoring unit 515 may determine whether or not the target person P authenticated in the step S125 is in the abnormal state, by determining whether or not the target person P is located in a different area from the person entry permitted area. Specifically, since the target person P authenticated in the step S125 is captured by the monitoring camera 4, the monitoring unit 515 is capable of identifying a current position of the target person P from the position of the imaging range 41 of the monitoring camera 4. Furthermore, the monitoring unit 515 is capable of identifying the person entry permitted area of the registered person P_R corresponding to the target person P, on the basis of the registration information DB 521. Consequently, the monitoring unit 515 is capable of determining whether or not the target person P is located in a different area from the person entry permitted area. When the target person P is determined to be located in a different area from the person entry permitted area, it is assumed that the target person P is located in an area where the target person P is not permitted to enter. In this instance, the monitoring unit 515 may determine that the target person P is in the abnormal state.

In addition to this, for example, the monitoring unit 515 may calculate a traveling speed of the target vehicle V by analyzing the monitoring image IMG_M, and may determine that the target vehicle V is in the abnormal state when the calculated traveling speed exceeds a speed limit. When the target vehicle V is a special vehicle whose travel permission period of allowing a travel on a road is limited, the monitoring unit 515 may identify the travel permission period of the target vehicle V by analyzing the monitoring image IMG_M, and may determine that the target vehicle V is in the abnormal state when the identified travel permission period has already elapsed. For example, the monitoring unit 515 may determine whether or not the target person P is smoking a cigarette by analyzing the monitoring image IMG_M, and may determine that the target person P is in the abnormal state when the target person P is smoking a cigarette in a place other than a smoking area. For example, the monitoring unit 515 may determine that the target vehicle V is in the abnormal state when the authentication of the target vehicle V is failed in the step S123 (i.e., when the target vehicle V that is not the registered vehicle V_R is located in the entry restricted area 9). For example, the monitoring unit 515 may determine that the target person P is in the abnormal state when the authentication of the target person P is failed in the step S125 (i.e., when the target person P who is not the registered person P_R is located in the entry restricted area 9).

When it is determined that the target vehicle V is in the abnormal state, the monitoring unit 515 may output warning informing for warning that the target vehicle V is in the abnormal state, to a predetermined user. For example, the monitoring unit 515 may output the alert information for warning that the target vehicle V is in the abnormal state, to the manager of the target vehicle V (i.e., the registered vehicle V_R), on the basis of the manager information included in the vehicle information 5212. For example, the monitoring unit 515 may output the alert information for warning that the target vehicle V is in the abnormal state, to the operator of the entry management system SYS. The user may investigate the target vehicle V that is in the abnormal state.

When it is determined that the target person P is in the abnormal state, the monitoring unit 515 may output alert information for warning that the target person P is in the abnormal state, to a predetermined user. For example, the monitoring unit 515 may output the alert information for warning that the target person P is in an abnormal state, to the manager of the target vehicle V (i.e., the registered vehicle V_R) in which the target person P is, on the basis of the manager information included in the vehicle information 5212. For example, the monitoring unit 515 may output the alert information for warning that the target person P is in the abnormal state, to the operator of the entry management system SYS. The user may investigate the target person P who is in the abnormal state.

(2-2-4) Person Exit Management Operation

Next, with reference to FIG. 12, a flow of the person exit management operation will be described. FIG. 12 is a flowchart illustrating the flow of the person exit management operation.

As illustrated in FIG. 12, the person authentication unit 512 acquires the person image IMG_P2 from the person gate apparatus 3 (step S131). The person gate apparatus 3 images the target person P located at the person entrance 92, by using the person camera 32 at the timing when the target person P arrives at the person entrance 92. Specifically, when the target person P leaves the second restricted area 9B through the person entrance 92, the person camera 32 images the target vehicle V located inside the second restricted area 9B. The imaging of the target person P located inside the second restricted area 9B by the person camera 32, may cause the entry management server 5 to start the person exit management operation illustrated in FIG. 12.

Then, the person authentication unit 512 authenticates the target person P by using the person image IMG_P2 acquired in the step S111 and the registration information DB 521 stored in the storage apparatus 52 (step S132). In the step S132, the operation of authenticating the target person P may be the same as the operation of authenticating the target person P in the step S112 in FIG. 10 described above. Therefore, a detailed description of the operation of authenticating the target person P in the step S132 in FIG. 12 will be omitted.

As a result of the authentication in the step S132, when the authentication of the target person P is failed (the step S133: No), it is assumed that the target person P located at the person entrance 92 stays in the entry restricted area 9 even though the target person P is not scheduled to enter the entry restricted area 9. Therefore, in this case, the person gate control unit 514 does not permit the target person P to pass through the person entrance 92 (step S135). The step S135 may be the same as the step S117 in FIG. 10 described above. Therefore, a detailed description of the step S135 in FIG. 12 will be omitted.

When the target person P is not permitted to pass through the person entrance 92, the person gate control unit 514 may output alert information for warning that the target person P is not permitted to pass through the person entrance 92, to a predetermined user. For example, the person gate control unit 514 may output the alert information for warning that the target person P is not permitted to pass through the person entrance 92, to the manager of the target vehicle V (i.e., the registered vehicle V_R) in which the target person P is, on the basis of the manager information included in the vehicle information 5212. For example, the person gate control unit 514 may output the alert information for warning that the target person P is not permitted to pass through the person entrance 92, to the operator of the entry management system SYS. The user may investigate the target person P who is not permitted to pass through the person entrance 92 (i.e., the target person P who stays in the entry restricted area 9 even though the target person P is not scheduled to enter the entry restricted area 9).

On the other hand, as a result of the authentication in the step S112, when the authentication of the target person P is successful (step S133: Yes), the person gate control unit 514 permits the target person P to pass through the person entrance 92 (step S134). The step S134 may be the same as the step S116 in FIG. 10 described above. Therefore, a detailed description of the step S134 in FIG. 12 will be omitted.

(2-2-5) Vehicle Exit Management Operation

Next, with reference to FIG. 13, a flow of the vehicle exit management operation will be described. FIG. 13 is a flowchart illustrating the flow of the vehicle exit management operation. As illustrated in FIG. 13, the vehicle authentication unit 511 acquires the vehicle image IMG_V from the vehicle gate apparatus 1 (step S141). The vehicle gate apparatus 1 images the target vehicle V located at the vehicle entrance 91, by using the vehicle camera 12 at the timing when the target vehicle V arrives at the vehicle entrance 91. Specifically, when the target vehicle V leaves the entry restricted area 9 through the vehicle entrance 91, the vehicle camera 12 images the target vehicle V located inside the entry restricted area 9 (specifically, the first restricted area 9A). The imaging of the target vehicle V located inside the entry restricted area 9 by the vehicle camera 12, may cause the entry management server 5 to start the vehicle exit management operation illustrated in FIG. 13.

Thereafter, the entry management server 5 performs the step S142 to the step S149, which may be respectively the same as the step S102 to the step S109 of the vehicle entry management operation illustrated in FIG. 9. That is, the vehicle authentication unit 511 authenticates the target vehicle V by using the vehicle image IMG_V acquired in the step S141 and the registration information DB 521 stored in the storage apparatus 52 (step S142). As a result of the authentication in the step S142, when the authentication of the target vehicle V is failed (the step S143: No), the vehicle gate control unit 513 does not permit the target vehicle V to pass through the vehicle entrance 91 (step S149). On the other hand, as a result of the authentication in the step S142, when the authentication of the target vehicle V is successful (the step S143: Yes), the person authentication unit 512 acquires the person image IMG_P1 from the user terminal 2 (step S144). Thereafter, the person authentication unit 512 authenticates the target person P by using each person image IMG_P1 acquired in the step S144 and the registration information DB 521 stored in the storage apparatus 52 (step S145). As a result of the authentication in the step S145, when the authentication is failed for at least one target person P who is an authentication target in the step S145 (step S146: No), the vehicle gate control unit 513 does not permit the target vehicle V to pass through the vehicle entrance 91 (step S149). On the other hand, as a result of the authentication in the step S145, when the authentication is successful for all the target persons P who are authentication targets in the step S145 (the step S146: Yes), the person authentication unit 512 determines whether or not the number of the target persons P who succeed in the authentication in the step S145 is the same as the number of the registered persons P_R who are scheduled to enter the entry restricted area 9 in the target vehicles V authenticated in the step S142

(who is thus naturally scheduled to leave the entry restricted area 9) (step S147). As a result of the determination in the step S147, when it is determined that the number of the target persons P who succeed in the authentication is not the same as the number of the registered persons P_R (the step S147: No), the vehicle gate control unit 513 may not permit the target vehicle V to pass through the vehicle entrance 91 (step S149). On the other hand, as a result of the determination in the step S147, when it is determined that the number of the target persons P who succeed in the authentication is the same as the number of the registered persons P_R (the step S147: Yes), the vehicle gate control unit 513 permits the target vehicle V to pass through the vehicle entrance 91 (step S148).

(2-3) Technical Effect of Entry Management System SYS

As described above, the entry management system SYS determines whether or not to permit the target vehicle V to pass through the vehicle entrance 91, by using the vehicle image IMG_V, the person image IMG_P1, and the registration information DB 521, at the vehicle entrance 91. This eliminates a need for the target person P to get out of the target vehicle V and fill out a document at the vehicle entrance 91 so as to entry the entry restricted area 9. Therefore, the target person P is able to enter the entry restricted area 9 with him staying in the target vehicle V. Therefore, a time required to enter the entry restricted area 9 is reduced. As a result, it is less likely that a large number of the target vehicles V that desire to enter the entry restricted area 9 are stuck at the vehicle entrance 91 (resulting in traffic jams). Therefore, the entry management system SYS is capable of solving a technical problem that a large number of the target vehicles V that desire to enter the entry restricted area 9 may be stuck at the vehicle entrance 91.

In addition, the entry management system SYS permits the target vehicle V to pass through the vehicle entrance 91, when the target vehicle V is determined to be the registered vehicle V_R and the target person P is determined to be the registered person P_R. Therefore, as compared with a case where the target vehicle V is permitted to pass through the vehicle entrance 91 even when the target vehicle V is determined to be the registered vehicle V_R, but the target person P is not determined to be the registered person P_R, the entry management system SYS is capable of more properly preventing a suspicious target person P from entering the entry restricted area 9. Similarly, as compared with a case where the target vehicle V is permitted to pass through the vehicle entrance 91 even when the target person P is determined to be the registered person P_R, but the target vehicle V is not determined to be the registered vehicle V_R, it is possible to more properly prevent the suspicious target person P from entering the entry restricted area 9. Therefore, the entry management system SYS is capable of solving a technical problem that the suspicious target person P may enter the entry restricted area 9.

In addition, the entry management system SYS permits the target vehicle V to pass through the vehicle entrance 91 when the number of the target persons P who succeed in the authentication is the same as the number of the registered persons P_R who are scheduled to enter the entry restricted area 9 in the target vehicle V that succeeds in the authentication. Therefore, as compared with a case where the number of the target persons P is not considered, the entry management system SYS is capable of more properly preventing the suspicious target person P from entering the entry restricted area 9.

In addition to determining whether or not to permit the target vehicle V to pass through the vehicle entrance 91, the entry management system SYS determines whether or not to permit the target person P to pass through the person entrance 92. Therefore, even if there is the target person P who unauthorizedly passes through the vehicle entrance 91, this target person P is not permitted to pass through the person entrance 92. Therefore, the entry management system SYS is capable of more properly preventing the suspicious target person P from entering the entry restricted area 9 (especially, the second restricted area 9B).

Furthermore, the entry management system SYS does not permit the target person P who has not attended the safety training, to pass through the person entrance 92. Therefore, as compared with a case where the target person P who has not attended the safety training is permitted to pass through the person entrance 92, the entry management system SYS is capable of more reliably ensuring safety in the factory that is the entry restricted area 9.

In addition, the entry management system SYS performs the monitoring operation for monitoring actions in the entry restricted area 9 of the target person P who has entered the entry restricted area 9. Therefore, the entry management system SYS is capable of identifying at least one of the target person P and the target vehicles V that is in the abnormal state. As a consequence, the entry management system SYS is capable of properly resolving the abnormal state, as compared with a case where the monitoring action is not performed.

(2-4) Modified Examples

In the above description, in the vehicle entry management operation in FIG. 9, the entry management server 5 determines whether or not the number of the target persons P who succeed in the authentication in the step S105 is the same as the number of the registered persons P_R who are scheduled to enter the entry restricted area 9 in the target vehicle V authenticated in the step S102 (step S107 in FIG. 9). The entry management server 5, however, may not perform the step S107 in FIG. 9.

In the above description, in the person entry management operation in FIG. 10, the entry management server 5 determines whether or not the authentication of the target person P is successful at the vehicle entrance 91 (step S114 in FIG. 10). The entry management server 5, however, may not perform the step S114 in FIG. 10.

In the above description, in the person entry management operation in FIG. 10, the entry management server 5 determines whether or not the target person P has attended the safety training (step S115 in FIG. 10). The entry management server 5, however, may not perform the step S115 in FIG. 10. When the entry management server 5 does not perform the step S115 in FIG. 10, the registration information DB 521 may not include the attendance information indicating whether or not the registered person P_R has attended the safety training. Alternatively, the entry management server 5 may, in addition to or instead of determining whether or not the target person P has attended the safety training in the person entry management operation in FIG. 10, determine whether or not the target person P located at the vehicle entrance 91 (i.e., the target person P in the target vehicle V located at the vehicle entrance 91) has attended the safety training in the vehicle entry management operation in FIG. 9. In this case, when it is determined that the target person P has not attended the safety training, the entry management server 5 may not permit the target vehicle V to pass through the vehicle entrance 91. When, the entry management server 5 may encourage the target person P to attend the safety training.

In the person entry management operation in FIG. 10, the entry management server 5 may determine whether or not a predetermined effective period has elapsed since the last time the target person P attended the safety training. That is, the entry management server 5 may determine whether or not the target person P has attended the safety training in the valid period. When it is determined that the effective period has elapsed since the last time the target person P attended the safety training (i.e., the target person P has not attended the safety training in the effective period), the entry management server 5 may not permit the target person P to pass through the person entrance 92. Then, the entry management server 5 may encourage the target person P to attend the safety training.

In the vehicle exit management operation in FIG. 13, when the registered person P_R who is scheduled to enter the entry restricted area 9 in the target vehicle V (who is thus naturally scheduled to leave the entry restricted area 9), even though the target vehicle V leaves the entry restricted area 9, has not left the entry restricted area 9, the vehicle gate control unit 513 may output alert information for warning that the registered person P_R has not left the entry restricted area 9, to a predetermined user. For example, the vehicle gate control unit 513 may output the alert information for warning that the registered person P_R has not left the entry restricted area 9, to the manager of the target vehicle V. For example, the vehicle gate control unit 513 may output the alert information for warning that the registered person P_R has not left the entry restricted area 9, to the operator of the entry management system SYS. The user may investigate a reason why the registered person P_R has not left the entry restricted area 9, or the like.

In the vehicle exit management operation in FIG. 13, when the registered person P_R who is scheduled to enter the entry restricted area 9 in the target vehicle V (who is thus naturally scheduled to leave the entry restricted area 9), even though the target vehicle V has not left the entry restricted area 9, has left the entry restricted area 9, the vehicle gate control unit 513 may output alert information for warning that the target vehicle V has not left the entry restricted area 9, to a predetermined user. For example, the vehicle gate control unit 513 may output the alert information for warning that the target vehicle V has not left the entry restricted area 9, to the manager of the target vehicle V. For example, the vehicle gate control unit 513 may output the alert information for warning that the target vehicle V has not left the entry restricted area 9, to the operator of the entry management system SYS. The user may investigate a reason why the target vehicle V has not left the entry restricted area 9, or the like.

In the above description, in the vehicle exit management operation in FIG. 13, the entry management server 5 determines whether or not the number of the target persons P who succeed in the authentication in the step S145 is the same as the number of the registered persons P_R who are scheduled to enter the entry restricted area 9 in the target vehicle V authenticated in the step S142 (who is thus naturally scheduled to leave the entry restricted area 9) (step S147 in FIG. 13). The entry management server 5, however, may not perform the step S147 in FIG. 13.

In the above description, in the vehicle exit management operation in FIG. 13, the entry management server 5 authenticates the target person P (step S144 to step S146 in FIG. 13). The entry management server 5, however, may not perform the step S144 to the step S146 in FIG. 13. In this situation, the target person P is able to leave the entry restricted area 9 in a different vehicle from the target vehicle V the target person P gets in so as to enter the entry restricted area 9. For example, in a situation where a first target person P and a second target person P2 get in a first target vehicle V and enter the entry restricted area 9, the first target person P who has completed work before the second target person P, is able to leave the entry restricted area 9 without waiting for the completion of the work of the second target person P. Therefore, it is possible to ensure flexibility in an exit time.

In the above description, the entry management server 5 performs the vehicle entry management operation, the person entry management operation, the monitoring operation, the person exit management operation, and the vehicle exit management operation. The entry management server 5, however, may not perform at least one of the vehicle entry management operation, the person entry management operation, the monitoring operation, the person exit management operation, and the vehicle exit management operation. When the entry management server 5 does not perform the vehicle entry management operation and the vehicle exit management operation, the entry management system SYS may not include the vehicle gate apparatus 1 and the user terminal 2, and the entry management server 5 may not include the vehicle authentication unit 511 and the vehicle gate control unit 513. When the entry management server 5 does not perform the person entry management operation and the person exit management operation, the entry management system SYS may not include the person gate apparatus 3, and the entry management server 5 may not include the person authentication unit 512 and the person gate control unit 514. When the entry management server 5 does not perform the monitoring operation, the entry management system SYS may not include the monitoring camera 4, and the entry management server 5 may not include the monitoring unit 515.

In the above description, the entry restricted area 9 is provided with the person entrance 92. The entry restricted area 9, however, may not be provided with the person entrance 92. The entry restricted area 9 may not be divided into the first restricted area 9A and the second restricted area 9B by the person entrance 92. In this instance, the entry management system SYS may not include the person gate apparatus 2 disposed at the person entrance 92. The entry management server 5 may not perform the person entry management operation and the person exit management operation based on the person image IMG_P2 generated by the person gate apparatus 2.

(3) Supplementary Notes

With respect to the example embodiments described above, the following Supplementary Notes are further disclosed.

[Supplementary Note 1]

An entry management system that manages entry to an entry restricted area of a target person who enters the entry restricted area in a target vehicle, the entry management system including:

a storage unit that stores registration information in which vehicle information indicating a vehicle number of a registered vehicle that is scheduled to enter the entry restricted area is associated with person information including a registration image of a registered person who is scheduled to enter the entry restricted area in the registered vehicle;

a first imaging unit that generates a vehicle image by imaging the target vehicle located at a vehicle entrance through which the target vehicle should pass to enter the entry restricted area;

a first determination unit that determines whether or not the target vehicle located at the vehicle entrance is the registered vehicle, by comparing a vehicle number of the target vehicle captured in the vehicle image with the vehicle number of the registered vehicle indicated by the vehicle information;

a second imaging unit that generates a person image by imaging the target person in the target vehicle located at the vehicle entrance;

a second determination unit that determines whether or not the target person in the target vehicle is the registered person, by comparing the person image with the registration image indicated by the person information; and an entry management unit that permits the target vehicle to pass through the vehicle entrance when the target vehicle located at the vehicle entrance is determined to be the registered vehicle and the target person in the target vehicle is determined to be the registered person, but does not permit the target vehicle to pass through the vehicle entrance when the target vehicle located at the vehicle entrance is determined to be not the registered vehicle and/or the target person in the target vehicle is determined to be not the registered person.

[Supplementary Note 2]

The entry management system according to Supplementary Note 1, wherein the vehicle information further indicates a number of the registered persons who are scheduled to enter the entry restricted area in the registered vehicle, and the entry management unit permits the target vehicle to pass through the vehicle entrance when a number of the target persons who are determined to be the registered persons matches the number of the registered persons indicated by the vehicle information, but does not permit the target vehicle to pass through the vehicle entrance when the number of the registered persons who are determined to be the registered persons does not match the number of the registered persons indicated by the person information.

[Supplementary Note 3]

The entry management system according to Supplementary Note 1 or 2, wherein the person image is a first person image, the entry management system includes:

a third imaging unit that generates a second person image by imaging the target person located at a person entrance through which the target person should pass after getting off the target vehicle, after the target vehicle passes through the vehicle entrance; and a third determination unit that determines whether or not the target person located at the person entrance is the registered person, by comparing the second person image with the registration image indicated by the person information, and the entry management unit permits the target person to pass through the person entrance when the target person located at the person entrance is determined to be the registered person, but does not permit the target person to pass through the person entrance when the target person located at the person entrance is determined to be not the registered person.

[Supplementary Note 4]

The entry management system according to Supplementary Note 3, wherein the entry management unit permits the target person to pass through the person entrance when the target person in the target vehicle located at the vehicle entrance is determined to be the registered person and the target person located at the person entrance is determined to be the registered person, but does not permit the target person to pass through the person entrance when the target person in the target vehicle located at the vehicle entrance is determined to be not the registered person and/or the target person located at the person entrance is determined to be not the registered person.

[Supplementary Note 5]

The entry management system according to Supplementary Note 3 or 4, wherein the entry restricted area includes an area in premises of a factory, the person information further indicates whether or not the registered person has attended safety training in the factory, the third determination unit determines, based on the person information, whether or not the target person located at the person entrance is the registered person who has attended the safety training, and the entry management unit permits the target person to pass through the person entrance when the target person located at the person entrance is determined to be the registered person who has attended the safety training, but does not permit the target person to pass through the person entrance when the target person located at the person entrance is determined to be not the registered person who has attended the safety training.

[Supplementary Note 6]

The entry management system according to any one of Supplementary Notes 1 to 5, wherein the person image is a first person image, the vehicle information includes information about contacts of a manager of the vehicle, the person information further indicates a person entry permitted area in which the registered person is permitted to enter, in the entry restricted area, and the entry management system further includes:

a fourth imaging unit that generates a third person image by imaging the target person located in the entry restricted area;

a fourth determination unit that determines whether or not the target person located in the entry restricted area is in a different area from the person entry permitted area indicated by the person information, by comparing the third person image with the registration image indicated by the person information; and an alert unit that outputs alert information for warning that the target person enters the different area from the person entry permitted area, to the contacts indicated by the vehicle information, when it is determined that the target person is in the different area from the person entry permitted area.

[Supplementary Note 7]

An entry management method that manages entry to an entry restricted area of a target person who enters the entry restricted area in a target vehicle, the entry management method including:

storing registration information in which vehicle information indicating a vehicle number of a registered vehicle that is scheduled to enter the entry restricted area is associated with person information including a registration image of a registered person who is scheduled to enter the entry restricted area in the registered vehicle;

generating a vehicle image by imaging the target vehicle located at a vehicle entrance through which the target vehicle should pass to enter the entry restricted area;

determining whether or not the target vehicle located at the vehicle entrance is the registered vehicle, by comparing a vehicle number of the target vehicle captured in the vehicle image with the vehicle number of the registered vehicle indicated by the vehicle information;

generating a person image by imaging the target person in the target vehicle located at the vehicle entrance;

determining whether or not the target person in the target vehicle is the registered person, by comparing the person image with the registration image indicated by the person information;

permitting the target vehicle to pass through the vehicle entrance when the target vehicle located at the vehicle entrance is determined to be the registered vehicle and the target person in the target vehicle is determined to be the registered person; and not permitting the target vehicle to pass through the vehicle entrance when the target vehicle located at the vehicle entrance is determined to be not the registered vehicle and/or the target person in the target vehicle is determined to be not the registered person.

[Supplementary Note 8]

A recording medium on which a computer program that allows a computer to execute an entry management method is recorded, the entry management method managing entry to an entry restricted area of a target person who enters the entry restricted area in a target vehicle, the entry management method including:

storing registration information in which vehicle information indicating a vehicle number of a registered vehicle that is scheduled to enter the entry restricted area is associated with person information including a registration image of a registered person who is scheduled to enter the entry restricted area in the registered vehicle;

generating a vehicle image by imaging the target vehicle located at a vehicle entrance through which the target vehicle should pass to enter the entry restricted area;

determining whether or not the target vehicle located at the vehicle entrance is the registered vehicle, by comparing a vehicle number of the target vehicle captured in the vehicle image with the vehicle number of the registered vehicle indicated by the vehicle information;

generating a person image by imaging the target person in the target vehicle located at the vehicle entrance;

determining whether or not the target person in the target vehicle is the registered person, by comparing the person image with the registration image indicated by the person information;

permitting the target vehicle to pass through the vehicle entrance when the target vehicle located at the vehicle entrance is determined to be the registered vehicle and the target person in the target vehicle is determined to be the registered person; and not permitting the target vehicle to pass through the vehicle entrance when the target vehicle located at the vehicle entrance is determined to be not the registered vehicle and/or the target person in the target vehicle is determined to be not the registered person.

At least a part of the constituent components of each of the example embodiments described above can be combined with at least another part of the constituent components of each of the example embodiments described above, as appropriate. A part of the constituent components of each of the example embodiments described above may not be used. Furthermore, to the extent permitted by law, all the references (e.g., publications) cited in this disclosure are incorporated by reference as a part of the description of this disclosure.

This disclosure is permitted to be changed, if desired, without departing from the essence or spirit of this disclosure which can be read from the claims and the entire identification. An entry management system, an entry management method, and a recording medium with such changes are also intended to be in the technical scope of this disclosure.

DESCRIPTION OF REFERENCE CODES

SYS Entry management system
1 Vehicle gate apparatus
12 Vehicle camera
2 User terminal
20 Camera
3 Person gate apparatus
32 Person camera
4 Monitoring camera
5 Entry management server
51 Arithmetic apparatus
511 Vehicle authentication unit
512 Person authentication unit
513 Vehicle gate control unit
514 Person gate control unit
515 Monitoring unit
52 Storage apparatus
521 Registration information DB
5210 Registration information record
5212 Vehicle information
5213 Person information
9 Entry restricted area
91 Vehicle entrance
92 Person entrance
1000 Entry management system
1100 Storage unit
1110 Registration information
1111 Vehicle information
1112 Person information
1200 First imaging unit
1300 First determination unit
1400 Second imaging unit
1500 Second determination unit
1600 Entry management unit
V Target vehicle
P Target person
V_R Registered vehicle
P_R Registered person
IMG_V Vehicle image
IMG_P1, IMG_P2 Person image
IMG M Monitoring image

What is claimed is:

1. An entry management system that manages entry to an entry restricted area of a target person who enters the entry restricted area in a target vehicle, the entry management system comprising:

a storage that stores registration information in which vehicle information indicating a vehicle number of a registered vehicle that is scheduled to enter the entry restricted area is associated with person information including a registration image of a registered person who is scheduled to enter the entry restricted area in the registered vehicle, and stores instructions;

a first camera that generates a vehicle image by imaging the target vehicle located at a vehicle entrance through which the target vehicle should pass to enter the entry restricted area;

at least one processor configured to execute the instructions to determine whether or not the target vehicle located at the vehicle entrance is the registered vehicle, by comparing a vehicle number of the target vehicle captured in the vehicle image with the vehicle number of the registered vehicle indicated by the vehicle information; and a second camera that generates a person image by imaging the target person in the target vehicle located at the vehicle entrance, the at least one processor is configured to execute the instructions to:

determine whether or not the target person in the target vehicle is the registered person, by comparing the person image with the registration image indicated by the person information; and permit the target vehicle to pass through the vehicle entrance when the target vehicle located at the vehicle entrance is determined to be the registered vehicle and the target person in the target vehicle is determined to be the registered person, but does not permit the target vehicle to pass through the vehicle entrance when the target vehicle located at the vehicle entrance is determined to be not the registered vehicle and/or the target person in the target vehicle is determined to be not the registered person, wherein the person image is a first person image, the vehicle information includes information about contacts of a manager of the registered vehicle, the person information further indicates a person entry permitted area in which the registered person is permitted to enter, in the entry restricted area, and the entry management system further comprises:

a third camera that generates a third person image by imaging the target person located in the entry restricted area, the at least one processor is configured to execute the instructions to:

determine whether or not the target person located in the entry restricted area is in a different area from the person entry permitted area indicated by the person information, by comparing the third person image with the registration image indicated by the person information; and output alert information for warning that the target person enters the different area from the person entry permitted area, to the contacts indicated by the vehicle information, when it is determined that the target person is in the different area from the person entry permitted area.

2. The entry management system according to claim 1, wherein the vehicle information further indicates a number of the registered persons who are scheduled to enter the entry restricted area in the registered vehicle, and the at least one processor is configured to execute the instructions to permit the target vehicle to pass through the vehicle entrance when a number of the target persons who are determined to be the registered persons matches the number of the registered persons indicated by the vehicle information, but does not permit the target vehicle to pass through the vehicle entrance when the number of the registered persons who are determined to be the registered persons does not match the number of the registered persons indicated by the vehicle information.

3. The entry management system according to claim 1, wherein the entry management system further comprises:

a fourth camera that generates a third person image by imaging the target person located at a person entrance through which the target person should pass after getting off the target vehicle, after the target vehicle passes through the vehicle entrance, the at least one processor is configured to execute the instructions to:

determine whether or not the target person located at the person entrance is the registered person, by comparing the third person image with the registration image indicated by the person information, and permit the target person to pass through the person entrance when the target person located at the person entrance is determined to be the registered person, but does not permit the target person to pass through the person entrance when the target person located at the person entrance is determined to be not the registered person.

4. The entry management system according to claim 3, wherein the at least one processor is configured to execute the instructions to permit the target person to pass through the person entrance when the target person in the target vehicle located at the vehicle entrance is determined to be the registered person and the target person located at the person entrance is determined to be the registered person, but does not permit the target person to pass through the person entrance when the target person in the target vehicle located at the vehicle entrance is determined to be not the registered person and/or the target person located at the person entrance is determined to be not the registered person.

5. The entry management system according to claim 3, wherein the entry restricted area includes an area in premises of a factory, the person information further indicates whether or not the registered person has attended safety training in the factory, the at least one processor is configured to execute the instructions to:

determine, based on the person information, whether or not the target person located at the person entrance is the registered person who has attended the safety training, and permit the target person to pass through the person entrance when the target person located at the person entrance is determined to be the registered person who has attended the safety training, but does not permit the target person to pass through the person entrance when the target person located at the person entrance is determined to be not the registered person who has attended the safety training.

6. An entry management method that manages entry to an entry restricted area of a target person who enters the entry restricted area in a target vehicle, the entry management method comprising:

storing registration information in which vehicle information indicating a vehicle number of a registered vehicle that is scheduled to enter the entry restricted area is associated with person information including a registration image of a registered person who is scheduled to enter the entry restricted area in the registered vehicle;

generating a vehicle image by imaging the target vehicle located at a vehicle entrance through which the target vehicle should pass to enter the entry restricted area;

determining whether or not the target vehicle located at the vehicle entrance is the registered vehicle, by comparing a vehicle number of the target vehicle captured in the vehicle image with the vehicle number of the registered vehicle indicated by the vehicle information;

generating a person image by imaging the target person in the target vehicle located at the vehicle entrance;

determining whether or not the target person in the target vehicle is the registered person, by comparing the person image with the registration image indicated by the person information;

permitting the target vehicle to pass through the vehicle entrance when the target vehicle located at the vehicle entrance is determined to be the registered vehicle and the target person in the target vehicle is determined to be the registered person; and not permitting the target vehicle to pass through the vehicle entrance when the target vehicle located at the vehicle entrance is determined to be not the registered vehicle and/or the target person in the target vehicle is determined to be not the registered person, wherein the person image is a first person image, the vehicle information includes information about contacts of a manager of the registered vehicle, the person information further indicates a person entry permitted area in which the registered person is permitted to enter, in the entry restricted area, and the entry management method further comprises:

generating a second person image by imaging the target person located in the entry restricted area, determining whether or not the target person located in the entry restricted area is in a different area from the person entry permitted area indicated by the person information, by comparing the second person image with the registration image indicated by the person information; and outputting alert information for warning that the target person enters the different area from the person entry permitted area, to the contacts indicated by the vehicle information, when it is determined that the target person is in the different area from the person entry permitted area.

7. A non-transitory recording medium on which a computer program that allows a computer to execute an entry management method is recorded, the entry management method managing entry to an entry restricted area of a target person who enters the entry restricted area in a target vehicle, the entry management method including:

storing registration information in which vehicle information indicating a vehicle number of a registered vehicle that is scheduled to enter the entry restricted area is associated with person information including a registration image of a registered person who is scheduled to enter the entry restricted area in the registered vehicle;

generating a vehicle image by imaging the target vehicle located at a vehicle entrance through which the target vehicle should pass to enter the entry restricted area;

determining whether or not the target vehicle located at the vehicle entrance is the registered vehicle, by comparing a vehicle number of the target vehicle captured in the vehicle image with the vehicle number of the registered vehicle indicated by the vehicle information;

generating a person image by imaging the target person in the target vehicle located at the vehicle entrance;

determining whether or not the target person in the target vehicle is the registered person, by comparing the person image with the registration image indicated by the person information;

permitting the target vehicle to pass through the vehicle entrance when the target vehicle located at the vehicle entrance is determined to be the registered vehicle and the target person in the target vehicle is determined to be the registered person; and not permitting the target vehicle to pass through the vehicle entrance when the target vehicle located at the vehicle entrance is determined to be not the registered vehicle and/or the target person in the target vehicle is determined to be not the registered person, wherein the person image is a first person image, the vehicle information includes information about contacts of a manager of the registered vehicle, the person information further indicates a person entry permitted area in which the registered person is permitted to enter, in the entry restricted area, and the entry management method further comprises:

generating a second person image by imaging the target person located in the entry restricted area, determining whether or not the target person located in the entry restricted area is in a different area from the person entry permitted area indicated by the person information, by comparing the second person image with the registration image indicated by the person information; and outputting alert information for warning that the target person enters the different area from the person entry permitted area, to the contacts indicated by the vehicle information, when it is determined that the target person is in the different area from the person entry permitted area.

* * * * *